US011962543B2

(12) United States Patent
Sundararajan et al.

(10) Patent No.: US 11,962,543 B2
(45) Date of Patent: Apr. 16, 2024

(54) WIRELESS DEVICE FULL DUPLEX COOPERATIVE SCHEMES

(71) Applicant: QUALCOMM Incorporated, San Diego, CA (US)

(72) Inventors: Jay Kumar Sundararajan, San Diego, CA (US); Prashanth Haridas Hande, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 16/949,750

(22) Filed: Nov. 12, 2020

(65) Prior Publication Data

US 2021/0152320 A1 May 20, 2021

Related U.S. Application Data

(60) Provisional application No. 62/936,239, filed on Nov. 15, 2019.

(51) Int. Cl.
*H04L 5/14* (2006.01)
*G06F 13/42* (2006.01)
(Continued)

(52) U.S. Cl.
CPC ............ *H04L 5/14* (2013.01); *G06F 13/4282* (2013.01); *H04W 72/0473* (2013.01); *H04W 76/10* (2018.02); *G06F 2213/0042* (2013.01)

(58) Field of Classification Search
CPC ..... H04L 5/14; H04L 5/0044; G06F 13/4282; G06F 2213/0042; H04W 72/0473; H04W 76/10; H04W 88/04; H04B 7/15528
See application file for complete search history.

(56) References Cited

U.S. PATENT DOCUMENTS

| 9,420,606 B2 | 8/2016 | Bhushan et al. |
| 2005/0138190 A1* | 6/2005 | Connor ............... H04L 69/161 |
| | | 709/250 |

(Continued)

FOREIGN PATENT DOCUMENTS

| CN | 102113406 A | 6/2011 |
| CN | 104838371 A | 8/2015 |

(Continued)

OTHER PUBLICATIONS

International Search Report and Written Opinion—PCT/US2020/060614—ISA/EPO—dated Mar. 1, 2021.

*Primary Examiner* — Chirag G Shah
*Assistant Examiner* — Joshua Smith
(74) *Attorney, Agent, or Firm* — Haynes and Boone, LLP/Qualcomm Incorporated

(57) ABSTRACT

Wireless communications systems and methods related to full-duplex cooperative communication by a first device tethered with a second device communicating with a third device. With the tether, one device between the first device and the second device is designated or selected as a transmitter, and the other device as a receiver. In full-duplex operation, the transmitter may transmit outgoing data concurrent to the receiver receiving incoming data. In an example, one of the first and second devices may have a modem that is used to control the full-duplex communication. The modem controls both transmission and reception. In another example, both devices may have a modem. Each modem may assume responsibility for part of the full-duplex communication by performing some processing before either shipping received data, or transmitting outgoing data. The amount of processing may be split at a link layer. Interference cancellation may mitigate interference from full-duplex operation.

30 Claims, 20 Drawing Sheets

(51) Int. Cl.
*H04W 72/044* (2023.01)
*H04W 76/10* (2018.01)

(56) References Cited

U.S. PATENT DOCUMENTS

| | | | | |
|---|---|---|---|---|
| 2005/0141443 | A1* | 6/2005 | Kim | H04W 36/18 |
| | | | | 370/312 |
| 2008/0304555 | A1* | 12/2008 | Larsson | H04B 7/15592 |
| | | | | 375/211 |
| 2009/0088165 | A1* | 4/2009 | Shen | H04B 7/2606 |
| | | | | 455/436 |
| 2009/0175214 | A1* | 7/2009 | Sfar | H04L 5/0035 |
| | | | | 370/315 |
| 2013/0044674 | A1* | 2/2013 | Teyeb | H04B 7/15542 |
| | | | | 370/315 |
| 2015/0333896 | A1* | 11/2015 | Damnjanovic | H04L 5/16 |
| | | | | 370/277 |
| 2016/0198416 | A1* | 7/2016 | Li | H04W 52/244 |
| | | | | 370/311 |
| 2017/0170946 | A1* | 6/2017 | Min | H04L 5/1438 |
| 2018/0007709 | A1 | 1/2018 | Seo et al. | |
| 2018/0019861 | A1* | 1/2018 | Pak | H04W 76/14 |
| 2018/0279202 | A1 | 9/2018 | Tenny et al. | |
| 2019/0363843 | A1* | 11/2019 | Gordaychik | H04L 5/0058 |
| 2020/0245311 | A1* | 7/2020 | Uchiyama | H04W 72/23 |
| 2020/0305225 | A1* | 9/2020 | Zhang | H04W 36/305 |
| 2021/0056059 | A1* | 2/2021 | Khurana | G06F 13/4282 |

FOREIGN PATENT DOCUMENTS

| | | | |
|---|---|---|---|
| EP | 2991241 | A1 | 3/2016 |
| WO | 2010002100 | A2 | 1/2010 |
| WO | 2015199942 | A1 | 12/2015 |

\* cited by examiner

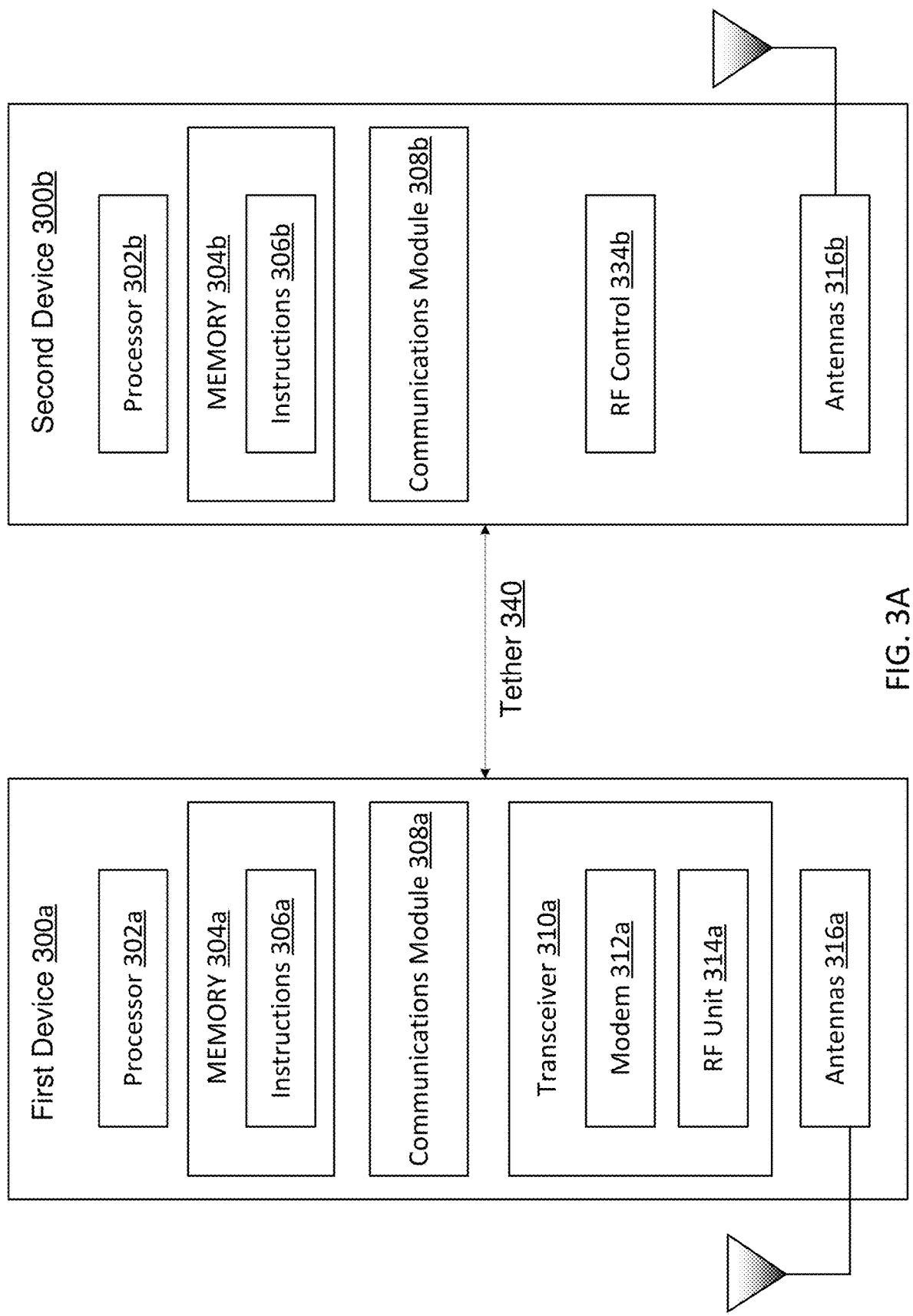

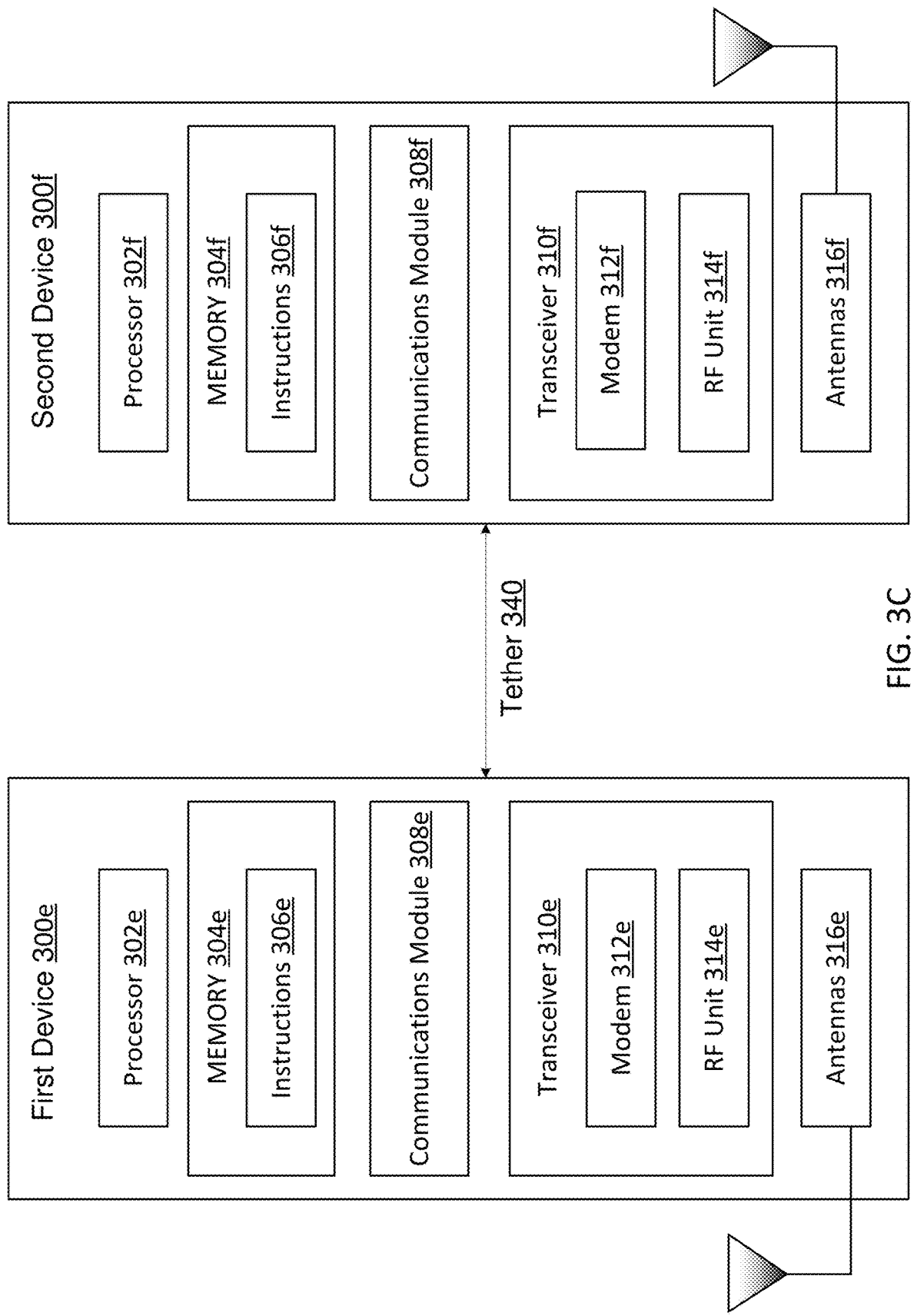

WIRELESS DEVICE FULL DUPLEX COOPERATIVE SCHEMES

CROSS REFERENCE TO RELATED APPLICATIONS

The present application claims priority to and the benefit of the U.S. Provisional Patent Application No. 62/936,239, filed Nov. 15, 2019, which is hereby incorporated by reference in its entirety as if fully set forth below in its entirety and for all applicable purposes.

TECHNICAL FIELD

This application relates to wireless communication systems, and more particularly to full-duplex cooperative communication schemes between a tethered set of devices and a third device.

INTRODUCTION

To meet the growing demands for expanded mobile broadband connectivity, wireless communication technologies are advancing from the long term evolution (LTE) technology to a next generation new radio (NR) technology, which may be referred to as 5th Generation (5G). In a wireless communication network implementing such wireless communication technologies, wireless multiple-access communications system may include a number of base stations (BSs), each simultaneously supporting communications for multiple communication devices, which may be otherwise known as user equipment (UE).

In some wireless communications systems, an extended reality (XR) device (or other device) may connect to another device, such as a UE, using one of a number of tether options, including a universal serial bus (USB) link, a Bluetooth link, a Wi-Fi link, a 5G sidelink, etc. In such systems, it may be appropriate for both devices to communicate with a base station while the devices are connected to each other. Conventional techniques for transmitting data to the base station and receiving data from the base station may experience limits in data rates, data capacity, and/or spectral efficiency, and therefore higher latency. Improved techniques for facilitating full-duplex communications between connected devices and a base station may therefore be desirable.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes determining, by a first wireless communications device connected via a tether to a second wireless communications device, whether to operate in cooperation with the second wireless communications device in full-duplex communication, the full-duplex communication comprising transmitting outgoing data simultaneously to receiving incoming data. The method further includes determining, by the first wireless communications device in response to determining to operate in full-duplex communication, whether to operate in a first mode of full-duplex communication or a second mode of full-duplex communication. The method further includes transmitting, by the first wireless communications device in response to determining to operate in the first mode, the outgoing data to a third wireless communications device, wherein the first mode comprises the first wireless communications device as a transmitter to the third wireless communications device and the second wireless communications device as a receiver from the third wireless communications device. The method further includes receiving, by the first wireless communications device in response to the determining to operate in the first mode, the incoming data via the tether received at the second wireless communications device from the third wireless communications device.

In an additional aspect of the disclosure, a method of wireless communication includes transmitting, by a first wireless communications device connected via a tether to a second wireless communications device, outgoing data to a third wireless communications device. The method further includes receiving, by the first wireless communications device, incoming data via the tether received at the second wireless communications device from the third wireless communications device, wherein the first wireless communications device cooperates with the second wireless communications device in full-duplex communication with the third wireless communications device, the full-duplex communication comprising the transmitting and the receiving occurring simultaneously.

In an additional aspect of the disclosure, a method of wireless communication includes receiving, by a first wireless communications device connected via a tether to a second wireless communications device, incoming data from a third wireless communications device. The method further includes transmitting, by the first wireless communications device, outgoing data via the tether to the second wireless communications device for transmission to the third wireless communications device, wherein the first wireless communications device cooperates with the second wireless communications device in full-duplex communication with the third wireless communications device, the full-duplex communication comprising the receiving and the transmitting occurring simultaneously.

In an additional aspect of the disclosure, a wireless communications device includes a processor configured determine whether to operate in cooperation with a second wireless communications device in full-duplex communication, the full-duplex communication comprising transmitting outgoing data simultaneously to receiving incoming data. The processor is further configured to determine, in response to determining to operate in full-duplex communication, whether to operate in a first mode of full-duplex communication or a second mode of full duplex communication. The wireless communications device further includes a transceiver configured to transmit, in response to determining to operate in the first mode, the outgoing data to a third wireless communications device, wherein the first mode comprises acting as a transmitter to the third wireless communications device and the second wireless communications device acting as a receiver from the third wireless communications device. The transceiver is further configured to receive, via a tether in response to the determining to operate in the first mode, the incoming data received at the second wireless communications device from the third wireless communications device.

In an additional aspect of the disclosure, a wireless communications device includes a processor. The wireless communications device further includes a transceiver configured to cooperate via a tether with a second wireless communications device in full-duplex communication with a third device, the full-duplex communication comprising transmitting outgoing data simultaneously to receiving incoming data. The transceiver is further configured to transmit, as part of the full-duplex communication, the outgoing data to the third wireless communications device. The transceiver is further configured to receive, via the tether, the incoming data received at the second wireless communications device from the third wireless communications device as part of the full-duplex communication.

In an additional aspect of the disclosure, a wireless communications device includes a processor. The wireless communications device further includes a transceiver configured to cooperate via a tether with a second wireless communications device in full-duplex communication with a third device, the full-duplex communication comprising transmitting outgoing data simultaneously to receiving incoming data. The transceiver is further configured to receive, as part of the full-duplex communication, the incoming data from the third wireless communications device. The transceiver is further configured to transmit, via the tether, the outgoing data to the second wireless communications device for transmission as part of the full-duplex communication to the wireless communications device concurrent to the receiving.

In an additional aspect of the disclosure, a non-transitory computer-readable medium having program code recorded thereon, the program code comprising code for causing a first wireless communications device, connected via a tether to a second wireless communications device, to determine whether to operate in cooperation with the second wireless communications device in full-duplex communication, the full-duplex communication comprising transmitting outgoing data simultaneously to receiving incoming data. The code further comprises code for causing the first wireless communications device to determine, in response to determining to operate in full-duplex communication, whether to operate in a first mode of full-duplex communication or a second mode of full-duplex communication. The code further comprises code for causing the first wireless communications device to transmit, in response to determining to operate in the first mode, the outgoing data to a third wireless communications device, wherein the first mode comprises the first wireless communications device as a transmitter to the third wireless communications device and the second wireless communications device as a receiver from the third wireless communications device. The code further comprises code for causing the first wireless communications device to receive, in response to the determining to operate in the first mode, the incoming data via the tether received at the second wireless communications device from the third wireless communications device.

In an additional aspect of the disclosure, a non-transitory computer-readable medium having program code recorded thereon, the program code comprising code for causing a first wireless communications device, connected via a tether to a second wireless communications device, to transmit outgoing data to a third wireless communications device. The code further comprises code for causing the first wireless communications device to receive, via the tether, incoming data received at the second wireless communications device from the third wireless communications device, wherein the first wireless communications device cooperates with the second wireless communications device in full-duplex communication with the third wireless communications device, the full-duplex communication comprising the transmitting and the receiving occurring simultaneously.

In an additional aspect of the disclosure, a non-transitory computer-readable medium having program code recorded thereon, the program code comprising code for causing a first wireless communications device, connected via a tether to a second wireless communications device, to receive incoming data from a third wireless communications device. The code further comprises code for causing the first wireless communications device to transmit outgoing data via the tether to the second wireless communications device for transmission to the third wireless communications device, wherein the first wireless communications device cooperates with the second wireless communications device in full-duplex communication with the third wireless communications device, the full-duplex communication comprising the transmitting and the receiving occurring substantially simultaneously.

In an additional aspect of the disclosure, a wireless communications device includes means for determining whether to operate in cooperation with a second wireless communications device connected via a tether to the wireless communications device in full-duplex communication, the full duplex-communication comprising transmitting outgoing data simultaneously to receiving incoming data. The wireless communications device further includes means for determining, in response to determining to operate in full-duplex communication, whether to operate in a first mode of full-duplex communication or a second mode of full-duplex communication. The wireless communications device further includes means for transmitting, in response to determining to operate in the first mode, the outgoing data to a third wireless communications device, wherein the first mode comprises the first wireless communications device as a transmitter to the third wireless communications device and the second wireless communications device as a receiver from the third wireless communications device. The wireless communications device further includes means for receiving, in response to the determining to operate in the first mode, the incoming data via the tether received at the second wireless communications device from the third wireless communications device.

In an additional aspect of the disclosure, a wireless communications device includes means for transmitting outgoing data to a third wireless communications device. The wireless communications device further includes means receiving, via a tether to a second wireless communications device, incoming data received at the second wireless communications device from the third wireless communications device, wherein the wireless communications device cooperates with the second wireless communications device in full-duplex communication with the third wireless communications device, the full-duplex communication comprising the transmitting and the receiving occurring simultaneously.

In an additional aspect of the disclosure, a wireless communications device includes means for receiving incoming data from a third wireless communications device. The wireless communications device further includes means for transmitting, via a tether to a second wireless communications device, outgoing data to the second wireless communications device for transmission to the third wireless communications device, wherein the wireless communications device is cooperating with the second wireless communications device in full-duplex communication with the third wireless communications device, the full-duplex communication comprising the transmitting and the receiving occurring simultaneously.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 3A illustrates a block diagram of multiple devices in full-duplex cooperative communication schemes according to some embodiments of the present disclosure.

FIG. 3C illustrates a block diagram of multiple devices in full-duplex cooperative communication schemes according to some embodiments of the present disclosure.

DETAILED DESCRIPTION

Figure 1:
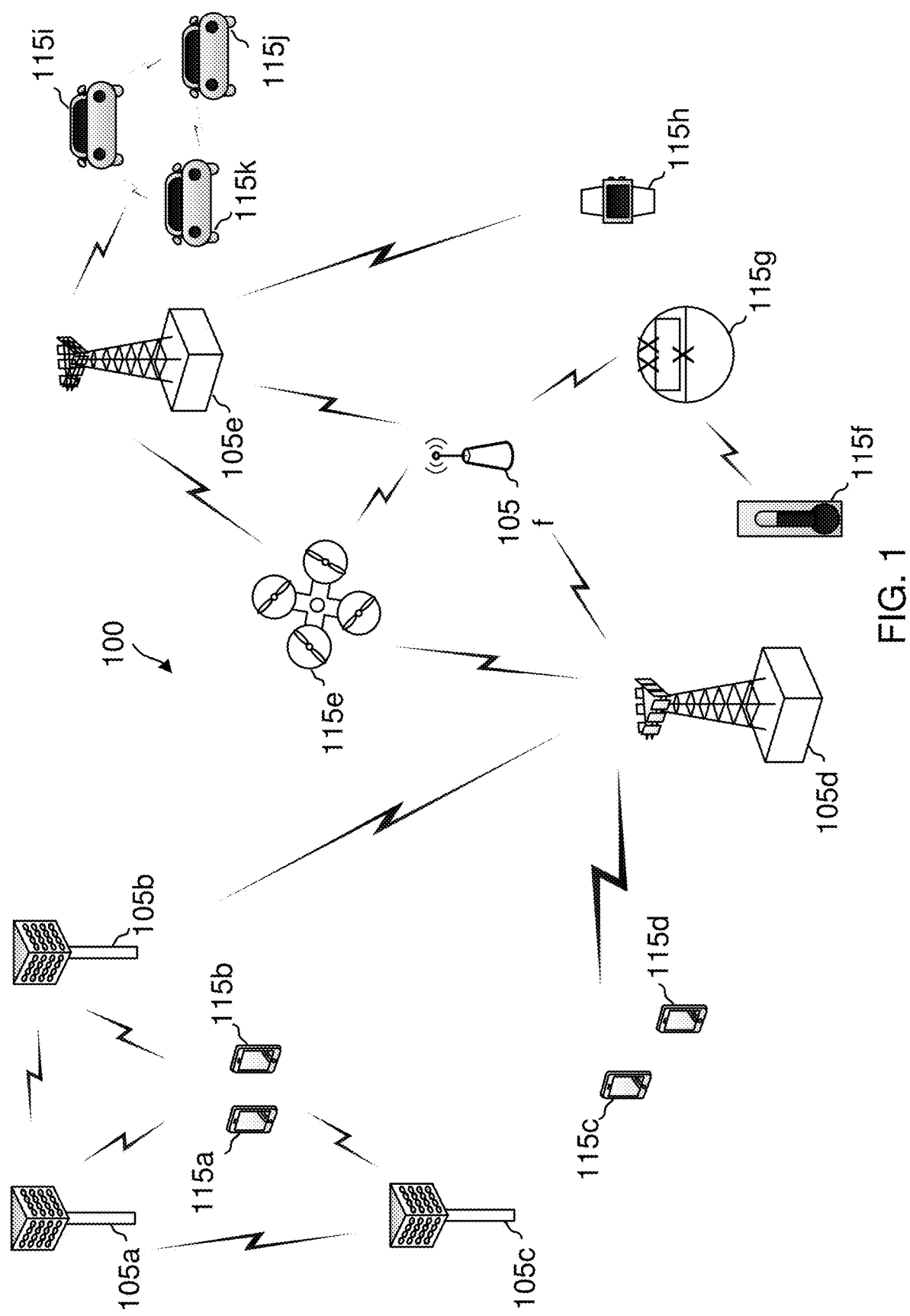
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SCFDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for engaging in full-duplex cooperative communication by using a tethered set of devices to communicate with a third device.

According to embodiments of the present disclosure, when a UE communicates with another device, such as for example with a base station or with another UE (e.g., via sidelink), it may do so using full-duplex communication with the assistance of a tethered device according to embodiments of the present disclosure. For example, where a UE is able to tether to another device (e.g., to a device with similar transmit/receive capability or a device with minimal transmit/receive capability), the UE may advertise (e.g., indicate via signaling) full-duplex communication capability with or without identifying the tethered aspect. When a device receives the advertisement, such as for example by a base station, the base station may respond and establish a full-duplex connection to last until broken.

The type of full-duplex communication that the UE engages into may depend upon the type of relationship existing between the UE and its tethered device. The tether may assume any in a variety of device-to-device connections, including for example any appropriate version of universal serial bus (USB), Bluetooth, Wi-Fi, Wi-Fi Direct, and/or sidelink to name a few examples. With the tether, one device between the UE and the tethered device is designated or selected as a transmitter, and the other device as a receiver. In full-duplex operation, the transmitter may transmit outgoing data concurrent (e.g., simultaneously/substantially simultaneously) to the receiver receiving incoming data.

In some examples, the UE may have a modem that is used to control the full-duplex communication, while the tethered device does not have a modem. In these situations, the modem at the UE will control both transmission and reception. For example, if the UE determines that it will be the receiver and the tethered device's antennas (one or more of them) will be the transmitter, the modem at the UE will process incoming data from its own antennas, as well as outgoing data before the outgoing data is sent to the tethered device for transmission. In other examples, the tethered device may have its own modem that assumes control, whether or not the UE has its own modem, in which case the tethered device will operate in like manner as described with respect to when the UE has the modem.

In yet other examples, both devices may each have modems. In such situations, each modem may assume responsibility for respective parts of the full-duplex communication. For example, where the application engaging in communication is at the UE, and both the UE and the tethered device have modems that assist in the full-duplex communication, the modem at the tethered device may perform some processing before either shipping received data back to the UE, or transmitting outgoing data to the BS. The amount of processing may be split at any of a variety of layers as will be discussed in more detail herein. The nature of the data packets shipped via the tether may depend upon which layer the processing between modems is split. In some examples according to any of the embodiments above or below, the UE may use interference cancellation to mitigate interference from the full-duplex operation.

Aspects of the present disclosure can provide several benefits. For example, higher data rates may be achieved due, for example, to higher capacity/throughput and better spectral efficiency. Moreover, latency may be reduced as more data may be conveyed in a shorter amount of time. Moreover, by configuring full-duplex communication between two spatially separate devices operating in cooperation with each other, embodiments of the present disclosure take advantage of spatial separation between the two tethered devices, which may render leakage from the designated transmitter of the tethered devices tolerable to the designated receiver of the tethered devices.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using hybrid automatic repeat request (HARQ) techniques to improve communication reliability, for example, to provide a ultra-reliable low latency communications (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple bandwidth parts (BWPs) (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel A TXOP may also be referred to as channel occupancy time (COT).

In some aspects, the network 100 may provision for sidelink communications to allow a UE 115 to communicate with another UE 115 without tunneling through a BS 105 and/or the core network. The BS 105 may configure certain resources in a licensed band and/or an unlicensed band for sidelink communications between the UE 115 and the other UE 115. A UE 115 may transmit, during sidelink communications, physical sidelink shared channel (PSSCH) data, physical sidelink shared control channel (PSCCH) sidelink control information (SCI), sidelink COT sharing SCI, sidelink scheduling SCI, and/or physical sidelink feedback channel (PSFCH) ACK/NACK feedbacks (e.g., HARQ for sidelink) to another UE and/or receive PSSCH data, PSCCH SCI, sidelink COT sharing SCI, sidelink scheduling SCI, and/or PSFCH ACK/NACK feedbacks from another UE 115.

When a UE 115 communicates with another device, such as for example with a base station 105 or with another UE 115 (e.g., via sidelink), it may do so using full-duplex communication with the assistance of a tethered device according to embodiments of the present disclosure. For example, where a UE 115 is able to tether to another device (e.g., to a device with its own transmit/receive capability such as a wearable device and/or other UE 115), the UE 115 may advertise full-duplex communication capability. This may occur after the UE has tethered with another device, or before tethering is completed. The UE 115 may advertise the full-duplex capability as though it were all part of the UE 115 itself, or alternatively with an indication identifying the tethered device as well. When a device receives the advertisement, such as for example by a base station 105, the base station 105 may respond and establish a full-duplex connection to last until broken by either side. In some examples, the UE 115 may first determine whether to initiate full-duplex communication before advertising, such as in cooperate with the other device. This determination may be based on a variety of factors (one or more in any combination), including for example the tether link quality, battery conditions/considerations, etc.

The type of full-duplex communication that the UE 115 engages into may depend upon the type of relationship existing between the UE 115 and its tethered device. As just one example, an extended reality (XR) head-mounted display (HMD) may be the tethered device. The tether may assume any in a variety of device-to-device connections, including for example any appropriate version of universal serial bus (USB), Bluetooth, Wi-Fi, Wi-Fi Direct, and/or sidelink to name a few examples. While embodiments of the present disclosure are applicable to a variety of device types to which the UE 115 is tethered to (the UE 115 itself being just one example of a variety of device types), an example is given with the UE 115 being tethered to an XR HMD for simplicity of discussion. With the tether, one device between the UE 115 and the XR HMD is designated or selected as a transmitter, and the other device as a receiver. In full-duplex operation, the transmitter may transmit outgoing data concurrent (e.g., substantially simultaneously) to the receiver receiving incoming data.

In some examples, the UE 115 may have a modem that is used to control the full-duplex communication, while the tethered XR HMD does not have a modem. In these situations, the modem at the UE 115 will control both transmission and reception. For example, if the UE 115 determines that it will be the receiver and the XR HMD's antennas (one or more of them) will be the transmitter, the modem at the UE 115 will process incoming data from its own antennas, as well as outgoing data before the outgoing data is sent to the XR HMD for transmission. In other examples, the XR HMD may have its own modem that assumes control, whether or not the UE 115 has its own modem, in which case the XR HMD will operate in like manner as described with respect to when the UE 115 has the modem.

In yet other examples, both devices may each have modems. In such situations, each modem may assume responsibility for respective parts of the full-duplex communication. For example, where the application engaging in communication is at the UE 115, and both the UE 115 and the XR HMD have modems that assist in the full-duplex communication, the modem at the XR HMD may perform some processing before either shipping received data back to the UE 115 (where the XR HMD is operating as a receiver), or transmitting outgoing data to the BS 105 (when shipped/received via the tether from the UE 115). The amount of processing may be split at the radio frequency (RF) layer, the physical (PHY) layer, the medium access control (MAC) layer, the radio link control (RLC) layer, or the packet data convergence protocol (PDCP) layer to name some examples. The nature of the data packets shipped via the tether may depend upon which layer the processing between modems is split.

In some examples, the UE 115 may transmit/receive in full-duplex cooperation with the tethered XR HMD using a single channel, multiple channels with no overlap, multiple channels with some overlap, substantial overlap, complete overlap, etc. In some examples, the UE 115 may transmit/receive in full-duplex cooperation with the tethered XR HMD using a single carrier, or on different carriers in the same frequency band, or on different frequency bands, etc. In some examples, the UE 115 may use interference cancellation to mitigate interference from the full-duplex operation. For example, where the UE 115 is a transmitter, the UE 115 may use the transmitting information to cancel out the transmitting signal from the received signal when it is shipped from the XR HMD operating as receiver. Where the XR HMD (again, just an example for discussion in this summary) has a modem as well, the UE 115 may also ship its outgoing data to the XR HMD to facilitate the XR HMD filtering out the interference from the transmission (where the XR HMD does some level of processing with its own modem). Where the UE is a receiver, the UE 115 may still use the transmitting information, e.g. taken from being shipped to the tethered XR HMD, and cancel out the transmitting signal from the received signal.

When it is time for the full-duplex connection to end, the UE 115 may send a notification to the receiving end (e.g., BS 105) that full-duplex communication will be ending at a specified future point. The notification may arise, for example, from a request to end the tether from one of the UE 115 and the XR HMD; as another example, the notification may arise in response to the UE 115 determined that transmit power, a measured interference level, or other network metric has passed a corresponding threshold indicating that full-duplex communication may no longer provide adequate quality of service or other service requirement. Alternatively, should the tether between the UE 115 and XR HMD break unexpectedly, the UE 115 and the BS 105 may determine implicitly that full-duplex communication has ended and resume with half-duplex communications. Over time, the UE 115 may transition between full-duplex and half-duplex communications with another device, such as BS 105.

Figure 2:
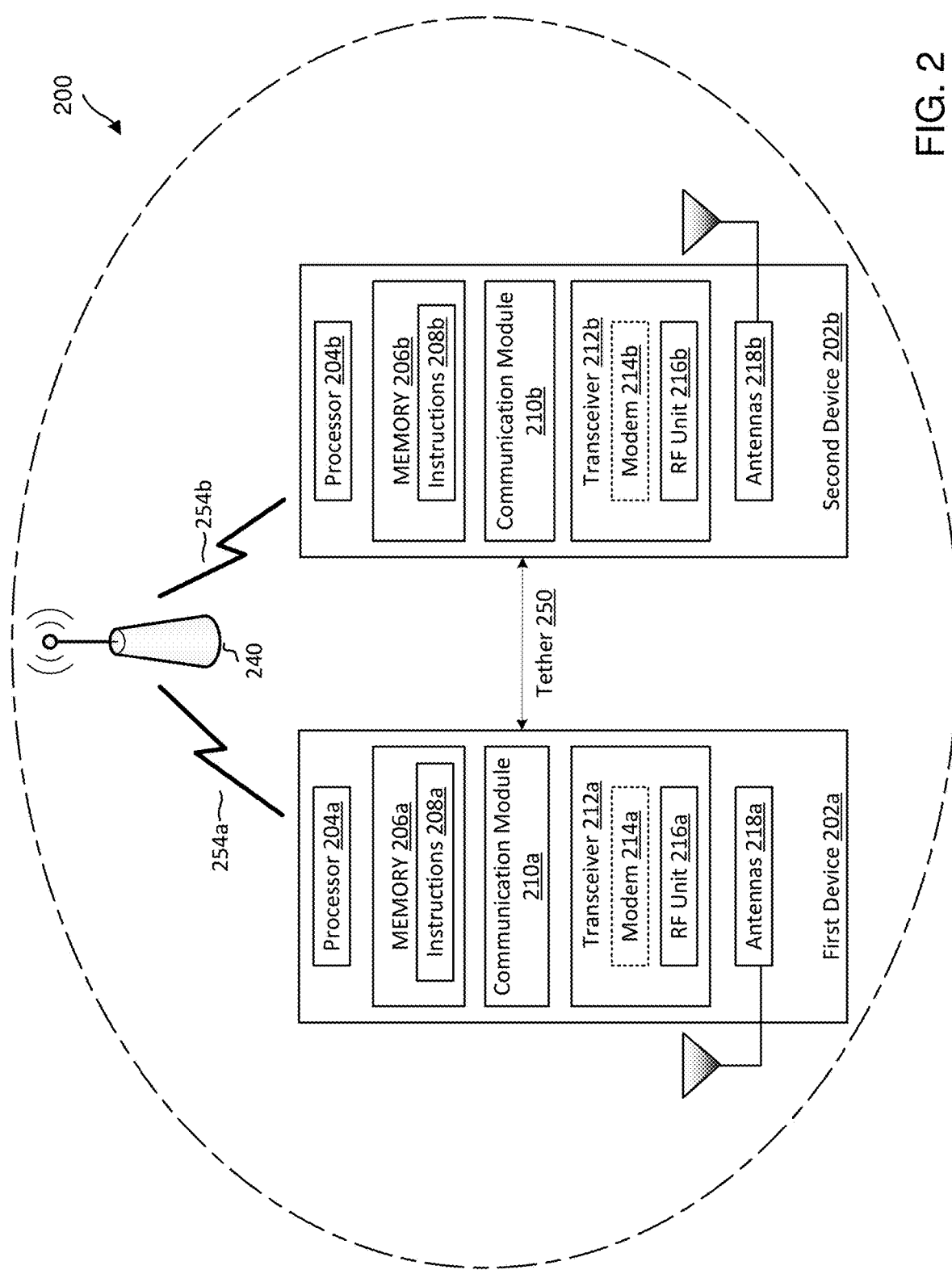
FIG. 2 illustrates a block diagram of multiple devices in full-duplex cooperative communication schemes according to some embodiments of the present disclosure.

FIG. 2 illustrates an example of a wireless communication network 200 that supports full-duplex communications via tethered devices according to embodiments of the present disclosure. The network 200 may be similar to the network 100. In some aspects, the network 200 may be an LTE network, an NR network, a combination of networks, etc.

FIG. 2 illustrates one BS 240 and two wireless communications devices, 202a and 202b. For purposes of simplicity of discussion, the two wireless communications devices 202a, 202b will be used as examples, though it will be recognized that embodiments of the present disclosure may scale to any suitable number of wireless communications devices. The BS 240 may be similar to, or an example of, the BSs 105 introduced in FIG. 1, and one or both of the wireless communications devices 202a, 202 may be similar to, or examples of, UEs 115 introduced in FIG. 1, and/or be similar to, or examples of, BSs 105 operating according to embodiments of the present disclosure.

The device 202a may be a UE 115 as discussed above in FIG. 1, examples of which include mobile phones, HMDs, wearable devices, and automobiles (or may be a BS 105—for simplicity of discussion herein, examples will be discussed with the first and second devices 202a, 202b as UEs in communication together (full-duplex) with a BS 105). As shown, the device 202a may include a processor 204a, a memory 206a, a communication module 210a, a transceiver 212a including an optional modem subsystem 214a and a radio frequency (RF) unit 216a, and one or more antennas 218a. These elements may be in direct or indirect communication with each other, for example via one or more buses.

The processor 204a may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 204a may also be implemented as a combination of computing devices, e.g., a combination of a DSP and a microprocessor, a plurality of microprocessors, one or more microprocessors in conjunction with a DSP core, or any other such configuration.

The memory 206a may include a cache memory (e.g., a cache memory of the processor 204a), random access memory (RAM), magnetoresistive RAM (MRAM), read-only memory (ROM), programmable read-only memory (PROM), erasable programmable read-only memory (EPROM), electrically erasable programmable read only memory (EEPROM), flash memory, solid state memory device, hard disk drives, other forms of volatile and non-volatile memory, or a combination of different types of memory. In an aspect, the memory 206a includes a non-transitory computer-readable medium. The memory 206a may store, or have recorded thereon, instructions 208a. The instructions 208a may include instructions that, when executed by the processor 204a, cause the processor 204a to perform the operations described herein with reference to the UEs 115 (generally, wireless communications devices capable of operating in full-duplex mode while tethered to another compatible device) in connection with aspects of the present disclosure. Instructions 208a may also be referred to as program code. The program code may be for causing a wireless communication device to perform these operations, for example by causing one or more processors (such as processor 204a) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 210a may be implemented via hardware, software, or combinations thereof. For example, the communication module 210a may be implemented as a processor, circuit, and/or instructions 208a stored in the memory 206a and executed by the processor 204a. In some instances, the communication module 210a can be integrated within the modem subsystem 214a (e.g., where first device 202a includes a modem subsystem). For example, the communication module 210a can be implemented by a combination of software components (e.g., executed by a DSP or a general processor) and hardware components (e.g., logic gates and circuitry) within the modem subsystem 214a.

The communication module 210a may be used for various aspects of the present disclosure. For example, the communication module 210a may direct the first device 202a in cooperating with another device, such as second device 202b illustrated in FIG. 2, to engage in full-duplex communication (e.g., with BS 240 in the example of FIG. 2, illustrated with UL and/or DL signals 254a, 254b). In some examples, the first device 202a may include a modem 214a while a tethered device, such as second device 202b, does not. In other examples, the first device 202a may not include a modem 214a, while the tethered device does include a modem to control full-duplex communication. In yet other examples, both the first device 202a and the second device 202b (examples of two tethered devices for purposes of discussion herein) may include a modem (illustrated as modems 214a and 214b, respectively in FIG. 2) that cooperate together for full-duplex communication with another device according to embodiments of the present disclosure.

The communication module 210a may initiate negotiation with another device, for example, second device 202b to establish a tether 250. In other examples, the other device, such as second device 202b, may initiate negotiation with the communication module 210a of the first device 202a. Where the first device 202a is able to establish a tether with the second device 202b, the communication module 210a may further determine whether the tethered devices are ready to initiate full-duplex communications with another device. This determination may be based on one or more factors, including for example a tether link quality between the first device 202a and the second device 202b (e.g., a better link quality increasing the likelihood of determining to establish full-duplex communications, etc.), a battery condition of one or both tethered devices, etc. This may include a negotiation between the first device 202a and the second device 202b via the tether 250, such as each device transferring the relevant factors to the other device, or just one device (such as second device 202a) transmitting the relevant factors to the first device 202a for analysis and determination. The tether link quality may be as measured by one or both of the first device 202a and the second device 202b, and likewise the battery condition of one or both devices, etc.

Further, in scenarios where the first device 202a includes the modem 214a, the communication module 210a may initiate transmission of an advertisement that informs listening devices, such as BS 240, of the first device 202a's full-duplex communication capability while tethered to second device 202b. In examples where the modem is instead at second device 202b, the device 202b may initiate such advertisement transmissions instead. In examples where both first device 202a and second device 202b include a modem 214a, 214b (respectively), which device controls such advertisement may be negotiated between the devices 202a, 202b (e.g., via the tether 250), or provisioned to each device beforehand (e.g., either via transmission from BS 240 or at initialization, etc.).

The tether 250 may assume any of a variety of device-to-device connections, for example as noted above any appropriate version of universal serial bus (USB), Bluetooth, Wi-Fi, Wi-Fi Direct, and/or sidelink to name a few examples. The tether 250 may additionally or alternatively represent various combinations of wired and/or wireless connection types (such as from those just listed) to increase throughput between the devices. For example, devices 202a, 202b may be tethered via both USB and Bluetooth simultaneously, or via Bluetooth and Wi-Fi simultaneously, etc. The tether 250 may carry various types of data between the devices 300, including but not limited to IP packets, PDCP protocol data units (PDU), RLC PDUs, MAC PDUs, HARQ control data, and quadrature signals (e.g., I/Q samples).

According to embodiments of the present disclosure, the first device 202a may engage in full-duplex communication with BS 240 via tether 250 between the first and second devices 202a, 202b (illustrated with UL and/or DL signals 254a, 254b in FIG. 2). Where the first device 202a includes the modem 214a, and the second device 214b does not include modem 214b, the communication module 210a may direct full-duplex communication. This may include, for example, determining which of the first device 202a and second device 202b will operate as transmitter and receiver in full-duplex communication with (in this example for sake of illustration) BS 240. Where the first device 202a operates as transmitter, the communication module 210a may direct the modem 214a to process incoming data from the second device 202b over the tether 250 (e.g., shipped at the RF layer as I/Q samples to name an example), as well as process outgoing data transmitted via the antennas 218a to the BS 240. Where the first device 202a operates as receiver, the communication module 210a may direct the modem 214a to process incoming data received via the antennas 218a from BS 240, as well as process outgoing data shipped over the tether 250 for transmission via the antennas 218b of the second device 202b. Further, the communication module 210a may apply interference cancellation techniques to mitigate self-interference that may arise from full-duplex communication. For example, where the first device 202a operates as transmitter, the communications module 210a may cancel out the transmitting signal from the received signal when shipped from the second device 202b. As another example, where the first device 202a operates as receiver, the communications module 210a may cancel out the transmitting signal before shipping to the second device 202b for transmission.

According to further embodiments of the present disclosure, both devices 202a and 202b may have modems 214a, 214b respectively. In these situations, the communication module 210a may negotiate via tether 250 with the communication module 210b of second device 202b regarding whether both devices 202a, 202b will engage in some level of data processing with their respective modems 214a, 214b. For example, in some situations while both devices 202a, 202b may include a respective modem, the communication modules 210a, 210b may negotiate that just one of the modems may be used in controlling full-duplex communication. In these situations, data processing may proceed as just discussed and as further explained below with respect to subsequent figures.

In other examples, the communication modules 210a, 210b may negotiate that each modem may engage in various levels of processing before completion of transmission or reception. For example, where the first device 202a operates as a transmitter and the second device 202b operates as a receiver, the communication module 210a may negotiate with communication module 210b (or vice versa) for the modem 214b of second device 202b to engage in some level of reception processing before passing incoming data via tether 250 to first device 202a (in an example where the application(s) requiring communication with BS 240 is executing on first device 202a). For example, the modem 214b may process the incoming data at the PHY layer before shipping the incoming data (e.g., as MAC PDUs) to the first device 202a, along with HARQ control information that is to be transmitted (e.g., ACK/NACK information). As another example, the modem 214b may process the incoming data at the PHY and MAC layers before shipping the incoming data (e.g., as RLC PDUs) together with HARQ control to the first device 202a. As another example, the modem 214b may process the incoming data at the PHY, MAC, and RLC layers before shipping (e.g., as PDCP PDUs, with RLC-HARQ control) to the first device 202a. As yet another example, the modem 214b may process the incoming data at the PHY, MAC, RLC, and PDCP layers before shipping (e.g., as IP packets, with PDCP-RLC-HARQ control) to the first device 202a. At the first device 202a's side, when the incoming data is shipped via the tether 250 to the first device 202a, the modem 214a may continue processing up the remaining layers before the communication module 210a provides the received data to the application expecting it. Further, in embodiments where interference cancellation is performed, the first device 202a may ship its outgoing data to the second device 202b (which is operating as receiver in full-duplex operation) so that the second device 202b, where it is processing incoming data at some layer, may use the shipped data from the first device 202a to cancel out the transmitting signal from the received signal.

As another example where both devices 202a, 202b have and use respective modems 214a, 214b, the communication modules 210a, 210b may negotiate that each modem may engage in various levels of processing where the first device 202a operates as a receiver and the second device 202b operates as a transmitter. For example, the first device 202a may, in such situations, partially process the outgoing data (to be transmitted in full-duplex operation via the tethered second device 202b in this example) through one or multiple logical layers (or none) before shipping via the tether 250 to the second device 202b for transmission (e.g., to BS 240 in the example).

In scenarios where the first device 202a includes the modem 214a, the communication module 210a may also initiate a transmission that informs listening devices, such as BS 240, when the first device 202a's full-duplex communication capability ends. This may occur, for example, where full-duplex communication is scheduled to end at some future point, or in response to a request from a tethered device (or the other side(s) of the full-duplex communication connection), or responsive to a change in some transmission metric (e.g., transmission power, interference level, etc. passing a threshold), or responsive to an unexpected break in the tether 250 (either upon detecting a break, or after a timeout period to allow for a re-tethering attempt, etc.). In examples where the modem is instead at second device 202b, the device 202b may initiate such transmissions instead. In examples where both first device 202a and second device 202b include a modem 214a, 214b (respectively), which device controls such ending transmission may be negotiated between the devices 202a, 202b (e.g., via the tether 250), or provisioned to each device beforehand (e.g., either via transmission from BS 240 or at initialization, etc.).

Continuing with respect to components of the device 202a, the transceiver 212a may include the optional modem subsystem 214a and the RF unit 216a. The transceiver 212a can be configured to communicate bi-directionally with other devices, such as the BSs 105 (such as BS 240 in FIG. 2's example) and other UEs 115. The optional modem subsystem 214a may be configured to modulate and/or encode the data from the memory 206a and/or the communication module 210a according to a modulation and coding scheme (MCS), e.g., a low-density parity check (LDPC) coding scheme, a turbo coding scheme, a convolutional coding scheme, a digital beamforming scheme, etc. The RF unit 216a may be configured to process (e.g., perform analog to digital conversion or digital to analog conversion, etc.) modulated/encoded data from the modem subsystem 214a (on outbound transmissions), from the tethered device (in this example, second device 202b), or of transmissions originating from another source such as a UE 115 or a BS 105. The RF unit 216a may be further configured to perform analog beamforming in conjunction with the digital beamforming. Although shown as integrated together in transceiver 212a, the modem subsystem 214a (where included) and the RF unit 216a may be separate devices that are coupled together at the first device 202a to enable the first device 202a to communicate with other devices.

The RF unit 216a may provide the modulated and/or processed data, e.g. data packets (or, more generally, data messages that may contain one or more data packets and other information), to the antennas 218a for transmission to one or more other devices. This may include data messages provided by the modem 214a where included in first device 202a, or data messages provided by modem 214b of second device 202b where the first device 202a does not include a modem 214a (and, in some examples, also does not include an RF unit 216a). In situations where there is no modem 214a (as well as no RF unit 216a in some examples), the first device 202a may instead have an RF control unit (for example as illustrated with respect to FIGS. 3A-3C below). Such RF control unit may include hardware and/or software to perform RF functionality such as transmit and receive functions, filtering, amplification, down- or up-converters, etc. (such as is the case with remote radio heads, etc.).

The antennas 218a may further receive data messages transmitted from other devices (e.g., groupcast and/or unicast messages, including data messages sent concurrently to data messages being transmitted while in full-duplex mode in cooperation with the tethered second device 202b). The antennas 218a may provide the received data messages for processing and/or demodulation at the transceiver 212a. The transceiver 212a may provide the demodulated and decoded data (e.g., PSSCH data and/or PSCCH control information, PSFCH negotiation information, HARQ ACK/NACK) to the communication module 210a for processing. For example, where the first device 202a has a modem 214a and is operating as a receiver in full-duplex mode in cooperation with tethered second device 202b, the antennas 218a may provide the received data to the transceiver 212a for demodulation and decoding by the modem 214a. In other examples, such as where the second device 202b has the modem 214b in control, the communication module 210a may ship the received data via the tether 250 to the second device 202b. This may be shipping the I/Q samples (where the first device 202a has no modem 214a), or higher-layer data where the first device 202a has a modem 214a and there is an agreement to split the processing between the modem 214a and the second device 202b's modem 214b. The antennas 218a may include multiple antennas of similar or different designs in order to sustain multiple transmission links. The RF unit 216a may configure the antennas 218a.

In an aspect, the first device 202a may include multiple transceivers 212a implementing different RATs (e.g., NR and LTE). In an aspect, the first device 202a can include a single transceiver 212a implementing multiple RATs (e.g., NR and LTE). In an aspect, the transceiver 212a can include various components, where different combinations of components can implement different RATs.

The device 202b may also be a UE 115 as discussed above in FIG. 1, examples of which include mobile phones, HMDs, wearable devices, and automobiles. As shown, the device 202b may include a processor 204b, a memory 206b, a communication module 210b, a transceiver 212b including an optional modem subsystem 214b and a radio frequency (RF) unit 216b, and one or more antennas 218b. These elements may be in direct or indirect communication with each other, for example via one or more buses. These elements may operate in substantially the same way as has been discussed above with respect to first device 202a when cooperating between the first device 202a and the second device 202b. While some operations were discussed above with respect to first device 202a, those same operations may instead occur with second device 202b with the first device 202a taking the place of second device 202b in the description above regarding FIG. 2.

Further, the BS 240 in FIG. 2 may include as well a processor, a memory, a communication module, a transceiver including modem subsystem and RF unit, and one or more antennas. These may operate substantially similarly as the similarly named components discussed above with respect to FIG. 2. In particular, aspects of the present disclosure may additionally apply to base stations, of which BS 240 is an example, to facilitate full-duplex communication with one or more UEs 115 (FIG. 1) being served by the BS 240. Thus, aspects discussed above with respect to first device 202a and second device 202b may also, or alternatively, occur with respect to two base stations operating together via a tether.

Figure 3B:
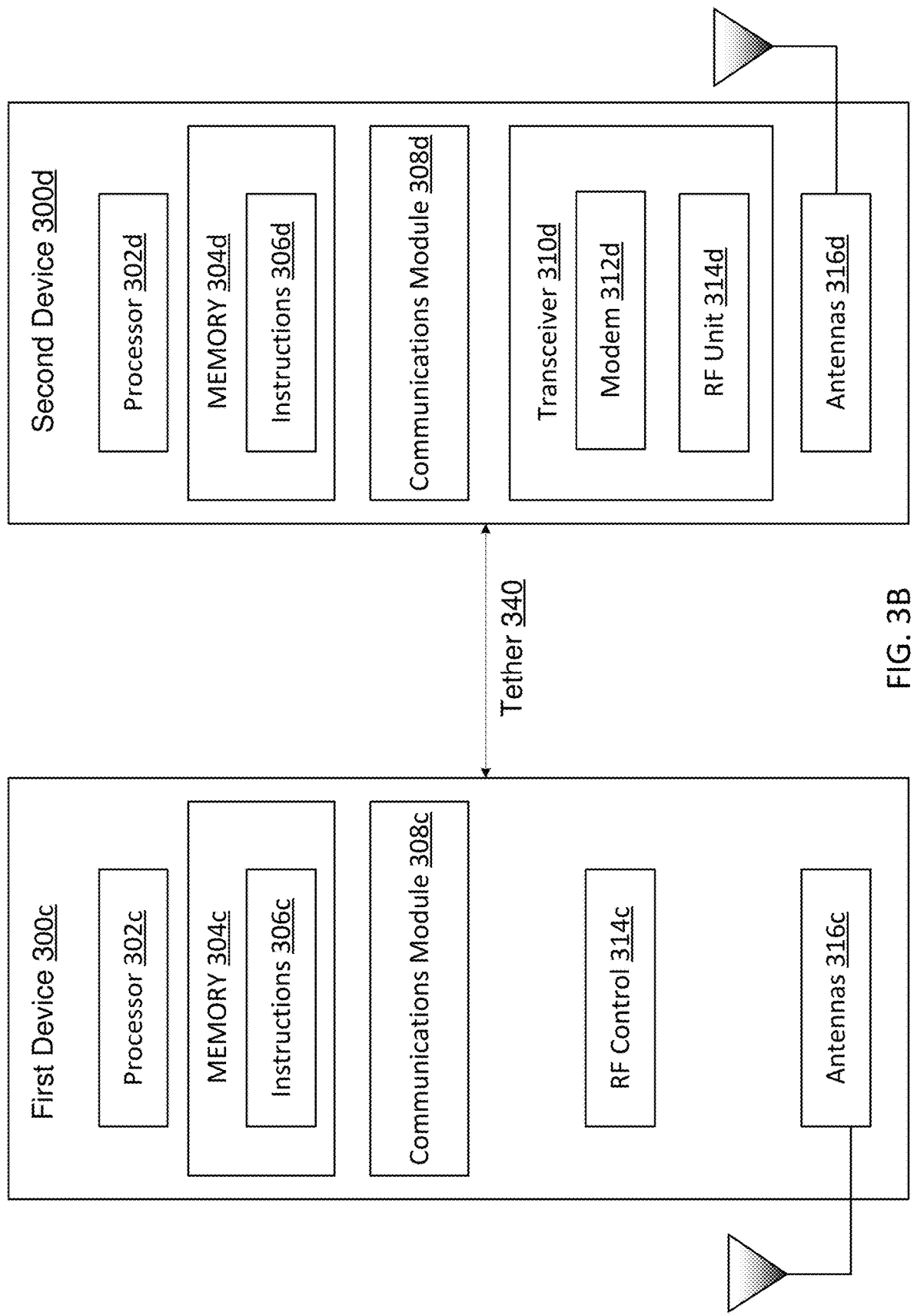
FIG. 3B illustrates a block diagram of multiple devices in full-duplex cooperative communication schemes according to some embodiments of the present disclosure.

Moving on from FIG. 2, the various options with respect to which of two (or both) tethered devices 202a, 202b have a modem are illustrated in FIGS. 3A-3C. In FIGS. 3A-3C, similarly-named components to those illustrated in FIG. 2 are addressed above—for example, processor 302 illustrated generally in FIGS. 3A-3C is described with respect to processor 204 of FIG. 2, memory 304 and memory 206 from FIG. 2, instructions 306 and instructions 208 from FIG. 2, communications module 308 and communications module 310 from FIG. 2, transceiver 310 and transceiver 212 from FIG. 2, etc. FIG. 3A is a block diagram of two exemplary wireless communications devices, first device 300a and second device 300b, connected via a tether 340 according to some aspects of the present disclosure.

In an example configuration of FIG. 3A, the first device 300a may be configured as a transmitter, and the second device 300b may be configured as a receiver, and operate together in full-duplex communication according to embodiments of the present disclosure (e.g., including determining to operate in full-duplex mode to begin with, such as upon tethering). In such a configuration, outgoing data from the first device 300a may be modulated and/or encoded by the modem 312a and transmitted by the RF Unit 314a using the antennas 316a. The second device 300b, e.g. via antennas 316b and RF control unit 334b (instead of using a modem), may receive incoming data from, for example, a base station 240 as in FIG. 2. As noted with respect to FIG. 2, the RF control unit 334b may include hardware and/or software to perform RF functionality such as transmit and receive functions, filtering, amplification, down- or up-converters, etc. (such as is the case with remote radio heads, etc.). After receiving the incoming data, the second device 300b may transfer the incoming data over the tether 340 to the first device 300a for demodulation by the modem 312a (and delivery to the application(s) that are the target of the data on the first device 300a).

Still with respect to FIG. 3A, in another embodiment of the present disclosure the first device 300a may instead be configured as a receiver and the second device 300b may be configured as a transmitter, and operate together in full-duplex communication according to embodiments of the present disclosure. In such a configuration, the first device 300a may receive incoming data from, for example, a base station 240 as in FIG. 2, via the antennas 316a and the RF unit 314a, and demodulated by the modem 312a. The modem 312a may further modulate and/or encode (in cooperation with the transceiver 310a generally) outgoing data from the first device 300a (i.e., from an application sourcing the outgoing data running on the first device 300a) and ship the outgoing data via the tether 340 to the second device 300b for transmission to a base station 240. The second device 300b, in turn, may transmit the outgoing data received via the tether 340 to the recipient (e.g., BS 240) by the RF control 334b and antennas 316b on the second device 300b. This may be done concurrent to receipt of data from the BS 240 (whether the same BS 240 or two different BSs) in full-duplex communication according to embodiments of the present disclosure.

Turning now to FIG. 3B, a block diagram of two exemplary wireless communications devices 300c, 300d connected via a tether 340 is illustrated according to some aspects of the present disclosure. In contrast to FIG. 3A, where the first device 300a had a transceiver 310a with modem 312a, and the second device 300b had an RF control unit 334b instead of transceiver 310a/modem 312a, the first device 300c has an RF control unit 314c instead of a transceiver/modem, while the second device 300d has a transceiver 310d with modem 312d and RF unit 314d. In this example, therefore, the application sourcing and/or receiving data may execute on the second device 300d. Thus, the description of FIG. 3A with respect to the first device 300a as either transmitter or receive in a full-duplex mode of operation may apply in describing the operation of second device 300d with respect to FIG. 3B.

FIG. 3C is a block diagram of two exemplary wireless communications devices 300e, 300f connected via a tether 340 according to some aspects of the present disclosure. In contrast to FIGS. 3A and 3B, where only one of the two devices had a modem (or transceiver generally) instead of an RF control unit, in FIG. 3C both devices 300e and 300f include respective transceivers 310e, 310f with modems 312e, 312f.

In the example configuration of FIG. 3C, the first device 300e may be configured as a transmitter, and the second device 300f may be configured as a receiver. In such a configuration, outgoing data from the first device 300e (i.e., from an application sourcing the outgoing data running on the first device 300e) may be modulated and/or encoded the by the modem 312e and transmitted by the RF Unit 314e using the antennas 316e. The second device 300f, using antennas 316f and transceiver 310f (with modem 312f in some examples) may receive incoming data from, for example, a base station 240 as in FIG. 2. In some examples, the second device 300f does not perform any demodulation on the incoming data, shipping instead the I/Q samples via the tether 340 to the first device 300e for further processing by the first device 300e's modem 312e. Alternately, the devices may divide demodulation functions between the modems 312e, 312f at various layers, such as described with respect to FIGS. 1 and 2 or further below with respect to FIGS. 5A-5E.

In another embodiment of the present invention, using the same example configuration of FIG. 3C, the first device 300e may be configured as a receiver and the second device 300f may be configured as a transmitter (with the application sourcing outgoing data running on the first device 300e). In such a configuration, the first device 300e may receive incoming data from, for example, a base station 240 as in FIG. 2, via the antennas 316e and RF unit 314e, and demodulated by the modem 312e. Outgoing data from the first device 300e may be shipped via the tether 340 to the second device 300f to be modulated by the modem 312f, then transmitted via RF unit 314f and antennas 316f. Alternately, the devices may divide modulation functions between the modems 312e, 312f at various layers, such as described with respect to FIGS. 1 and 2 or further below with respect to FIGS. 5A-5E.

Figure 4A:
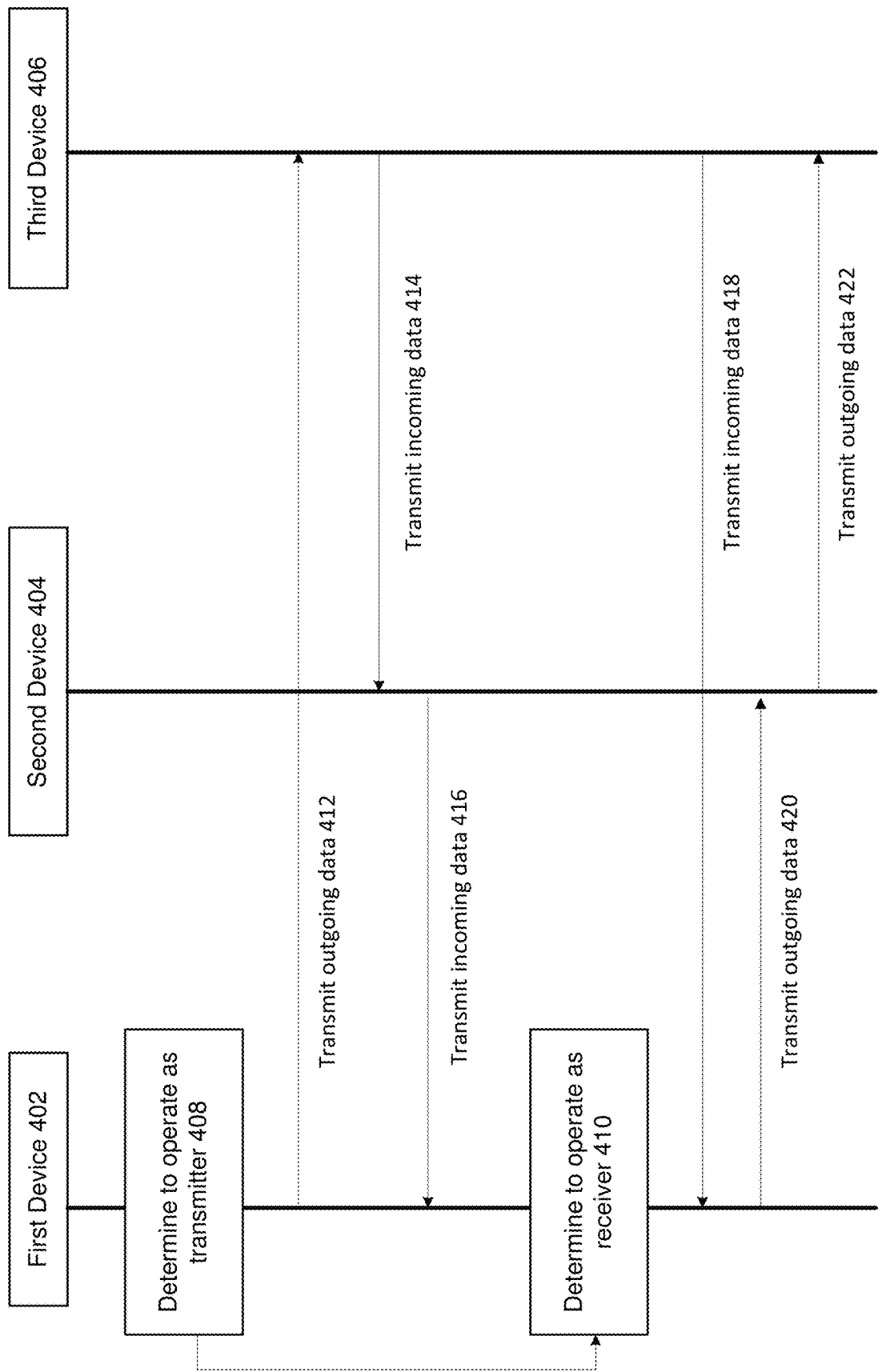
FIG. 4A illustrates a protocol diagram of a full-duplex cooperative communication scheme according to some embodiments of the present disclosure.

FIG. 4A illustrates a protocol diagram of a full-duplex cooperative communication scheme according to some embodiments of the present disclosure. In some examples, before action 408 the first device 402 may negotiate with the second device 404 to determine whether the tethered (or soon to be tethered devices) are in a condition to engage in full-duplex communications according to embodiments of the present disclosure. This may be based, as noted above, on one or more factors including tether link quality, battery conditions, etc.

The first device 402, which may be a UE 115 (or BS 105) or other device with wireless communications capabilities, may determine at action 408 to operate as a transmitter to the third device 406, for example a base station 105 (or other UE 115, etc.), and use (via a tether) the second device 404 as a receiver in the full-duplex cooperative communication scheme. In these situations, the first device 402 proceeds with actions 412-416 as discussed below. Alternately, the first device 402 may determine to operate as a receiver of data from the third device 406 at action 410, and use the second device 404 as a transmitter in the full-duplex cooperative communication scheme.

The determination of whether to operate as a transmitter or receiver may depend on any number of factors or combination of factors. For example, the determination may be made based on interference, with the first device 402 determine whether operating as a transmitter or receive would better reduce the amount of self-interference between tethered first device 402 and second device 404. In some examples, in order to reduce the amount of self-interference, the device with lesser transmit power may be chosen as the transmitter. This may be done, for example, in order to minimize the amount of self-interference to avoid the transmitter drowning out the capabilities of the receiver. As another example, the first device 402 may determine whether to operate as transmitter or receiver (and the second device 404 as receiver or transmitter, respectively) based on a measured interference level. Other example metrics include quality of service, bitrate, throughput, signal-to-noise ratio (SNR), a signal-to-interference-plus-noise ratio (SINR), reference signal received power (RSRP), a reference signal received quality (RSRQ), a received signal strength indicator (RSSI), to name just a few examples.

Considerations other than the performance of devices 402 and 404, such as the performance of the overall network, may also guide the determination. For the sake of brevity, in the example discussed in FIG. 4A the first device 402 makes the determination as to which mode—transmitter or receiver—to operate in. However, in other embodiments of the present disclosure, the determination may likewise be made by the second device 404, the third device 406, etc.

In an embodiment of the present disclosure, the first device 402 may determine to operate as a transmitter at action 408 and have the second device 404 operate as a receiver (in cooperation with first device 402 via a tether for full-duplex communication with the third device 406). In some examples, the first device 402 may convey to the third device 406—an intended target of full-duplex communication, that the first device 402 will be operating in full-duplex mode. In doing so, the first device 402 may not identify the assistance of the tethered second device 404, while in other examples the first device 402 may identify the second device 404 that will be assisting in the full-duplex communications.

As a result of the determination at action 408 for the first device 402 to operate as a transmitter, at action 412 the first device 402 may transmit outgoing data, when such originates from an application(s) on the first device 402 to the third device 406.

Concurrent to transmitting outgoing data to the third device 406, at action 414 the third device 406 may transmit incoming data directed to the first device 402. However, according to embodiments of the present disclosure, the third device 406 sends the incoming data to the second device 404. When the second device 404 receives the incoming data (e.g., generally concurrent to the transmitting outgoing data), if it has a modem the second device 404 may process the incoming data as agreed between the first device 402 and the second device 404. If the second device 404 does not have a modem, or in situations where the second device 404 has a modem but is not using it in the full-duplex mode, the incoming data is not processed in this manner at the second device 404.

Whether processed to some degree or not by the second device 404, at action 416 the second device 404 ships the received incoming data via a tether to the first device 402. The incoming data may then be processed and provided to one or more applications at the first device 402. This processing may include, for example, self-interference cancellation using the transmission information known to the first device 402.

Alternatively, and as noted above, at action 410 the first device 402 may determine to instead operate as a receiver and have the second device 404 operate as a transmitter.

As a result of the determination at action 410 (which may be part of the same action 408 or separate actions), at action 418 the first device 402 may receive incoming data from the third device 406.

As shown at action 420 the first device 402 may ship outgoing data via a tether to the second device 404. If there is no modem at the second device 404, the modem of the first device 402 will process/modulate/etc. the outgoing data before shipping to the second device 404. If there is a modem at the second device 404, the modem of the first device 402 may reduce or not process at all the outgoing data before shipping, relying instead upon the second device 404 processing/modulating/etc. the outgoing data. With shipping of the outgoing data, the first device 402 may also perform interference cancellation using the shipped outgoing data on the received incoming data.

At action 422, the second device 404 may transmit the outgoing data to the third device 406, e.g. concurrent to receiving the incoming data. This may be done, according to embodiments of the present disclosure, generally concurrent to receiving the incoming data (e.g., from the third device 406 or other device). Thus, full-duplex communication may be achieved.

While in FIG. 4A discussion has been with respect to the first device 402 making the determination (as well as with respect to the rest of FIGS. 4B-4E), this is from the perspective of the device with an application on the first device 402 taking advantage of full-duplex communication according to embodiments of the present disclosure. In these examples, the second device 404 may alternatively have an application executing that may take advantage of full-duplex communication according to embodiments of the present disclosure, in which case it would assume the identity of the "first device 402" in the above (and below) discussions.

Figure 4B:
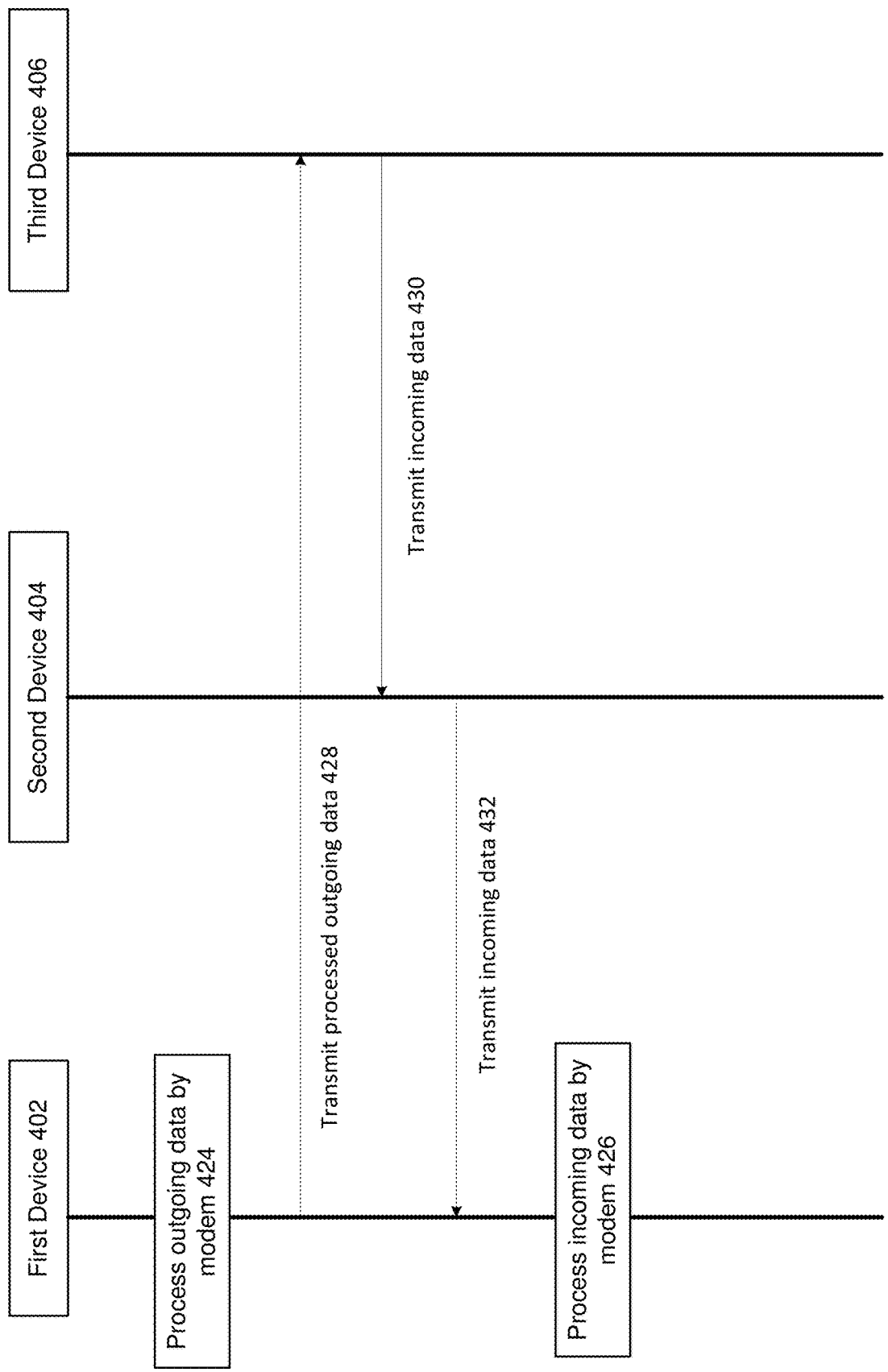
FIG. 4B illustrates a protocol diagram of a full-duplex cooperative communication scheme according to some embodiments of the present disclosure.

FIG. 4B illustrates a protocol diagram of a full-duplex cooperative communication scheme according to some embodiments of the present disclosure. In the exemplary embodiment of FIG. 4B, the second device 404 lacks a modem, or includes a modem, but the modem is inactive/ignored, so that operations involving a modem are performed with respect to the first device 402. In the example of FIG. 4B, the first device 402 may operate in transmitter mode, and the second device 404 may operate in receiver mode. In some examples, before action 424 the first device 402 may negotiate with the second device 404 to determine whether the tethered (or soon to be tethered devices) are in a condition to engage in full-duplex communications according to embodiments of the present disclosure. This may be based, as noted above, on one or more factors including tether link quality, battery conditions, etc.

When there is outgoing data to transmit, such as originates from an application(s) on the first device 402 to the third device 406, the outgoing data is sent to first device 402's modem (e.g., modem 214a in the example of FIG. 2), via, for example, a bus. At action 424, the modem may process the outgoing data by, for example, modulating the data.

At action 428, after the data is processed by the first device 402's modem, the first device 402 may transmit the processed outgoing data to the third device 406.

Concurrent to transmitting outgoing data to the third device 406, at action 430 the third device 406 may transmit incoming data directed to the first device 402. According to embodiments of the present disclosure, to facilitate full-duplex operation the transmission of the incoming data may be directed to the second device 404, which in FIG. 4B is operating as a receiver for the first device 402. Thus, the incoming data may be received at the second device 404 (operating in receiver mode) generally concurrent to the first device 402 transmitting the outgoing data.

As a result, at action 432 the second device 404 ships the received incoming data via a tether to the first device 402.

At action 426, the modem of the first device 402 processes the incoming data, which may include demodulating the incoming data. This may include, as noted above, interference cancellation. The demodulated data is provided to the application(s) that are the intended target(s).

Figure 4C:
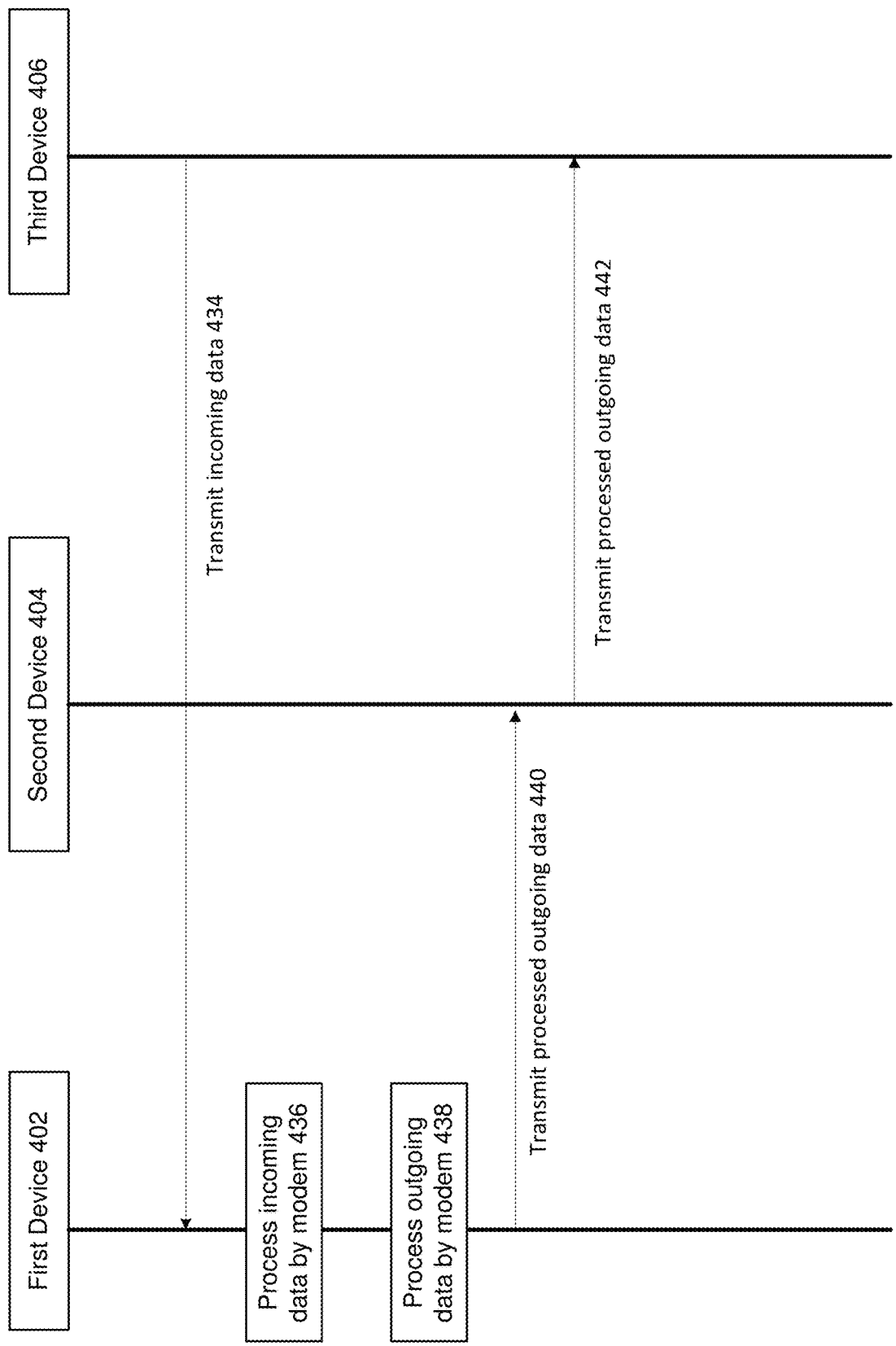
FIG. 4C illustrates a protocol diagram of a full-duplex cooperative communication scheme according to some embodiments of the present disclosure.

FIG. 4C illustrates a protocol diagram of a full-duplex cooperative communication scheme according to some embodiments of the present disclosure. In the exemplary embodiment of FIG. 4C, the second device 404 lacks a modem, or includes a modem, but the modem is inactive/ignored, so that operations involving a modem are performed with respect to the first device 402. In the example of FIG. 4C, the first device 402 may operate in receiver mode, and the second device 404 may operate in transmitter mode. In some examples, before action 434 the first device 402 may negotiate with the second device 404 to determine whether the tethered (or soon to be tethered devices) are in a condition to engage in full-duplex communications according to embodiments of the present disclosure. This may be based, as noted above, on one or more factors including tether link quality, battery conditions, etc.

At action 434, the third device 406 transmits incoming data to the first device 402, instead of being received at the second device 404 and then shipped to first device 402.

At action 436, the modem of the first device 402 may process (e.g., demodulate) the incoming data. This may include interference cancellation, as noted above, using the shipped outgoing data.

In addition to receiving and processing the incoming data, the first device 402 may process outgoing data (e.g., originating from an application(s) on the first device 402) at action 438.

At action 440, the first device 402 may ship the modulated, outgoing data to the second device 404 via tether.

At action 442, the second device 404 transmits (in its role as transmitter according to embodiments relating to FIG. 4C) the outgoing data to the third device 406. According to embodiments of the present disclosure, the first device 402 may receive incoming data via its own antennas generally concurrent to transmission by the second device 404 of the outgoing data, to facilitate full-duplex operation.

Figure 4D:
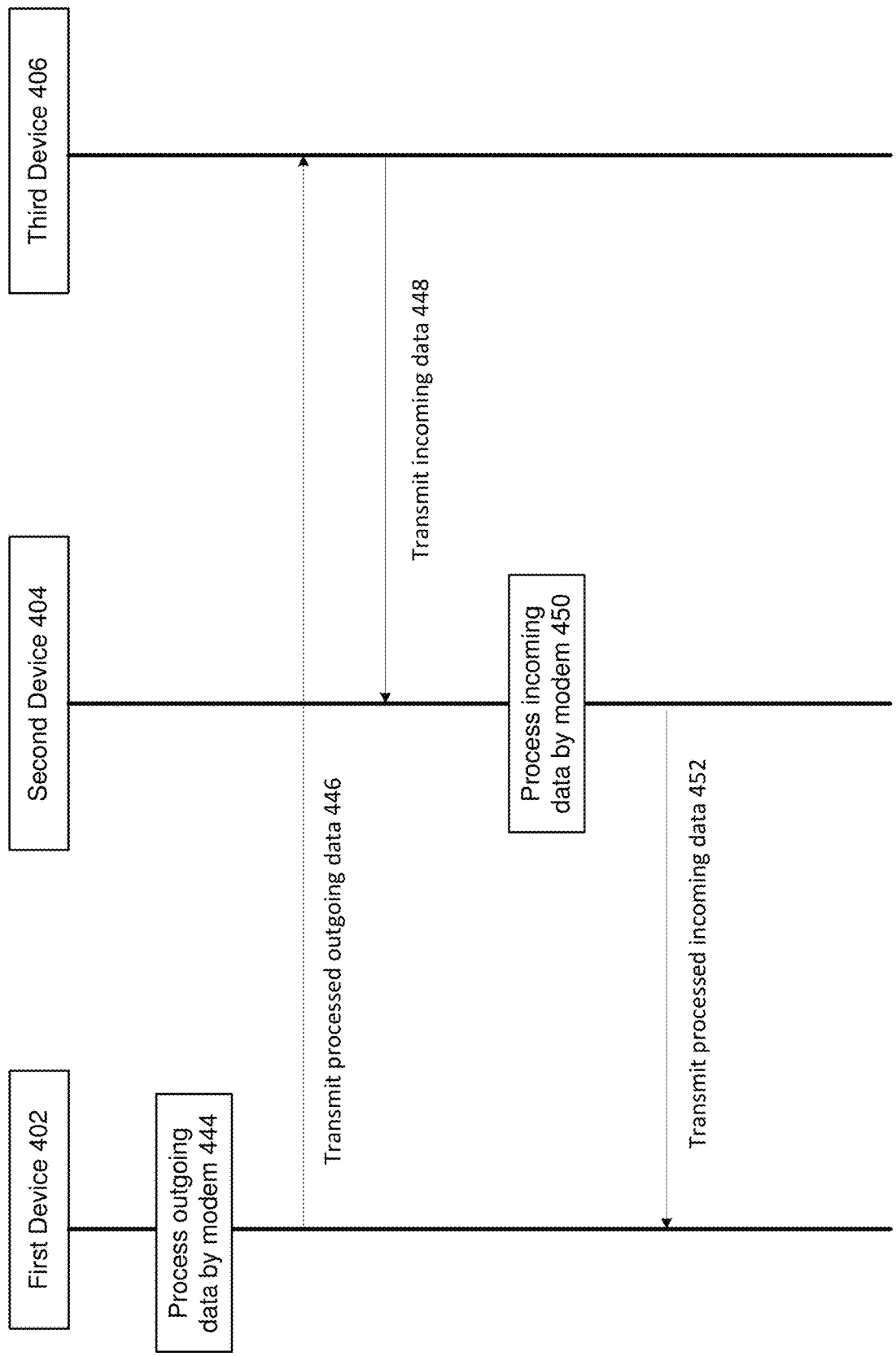
FIG. 4D illustrates a protocol diagram of a full-duplex cooperative communication scheme according to some embodiments of the present disclosure.

FIG. 4D illustrates a protocol diagram of a full-duplex cooperative communication scheme according to some embodiments of the present disclosure. In the exemplary embodiment of FIG. 4D, both the first device 402 and the second device 404 respectively include a modem, and the first device 402 has an application that takes advantage of the full-duplex cooperation communication scheme. Moreover, in the example of FIG. 4D, the first device 402 may operate in transmitter mode, and the second device 404 may operate in receiver mode. In some examples, before action 444 the first device 402 may negotiate with the second device 404 to determine whether the tethered (or soon to be tethered devices) are in a condition to engage in full-duplex communications according to embodiments of the present disclosure. This may be based, as noted above, on one or more factors including tether link quality, battery conditions, etc.

Similar to FIG. 4B, when there is outgoing data to transmit to the third device 406, such as originating from the application taking advantage of full-duplex communication, the outgoing data is sent to first device 402's modem (e.g., modem 214a in FIG. 2's example) via a bus (for example). At action 444, the modem of the first device 402 may process the outgoing data, for example by modulating the data.

At action 446, the first device 402 may transmit the processed outgoing data to the third device 406.

Concurrent to transmitting outgoing data to the third device 406, at action 448 the third device 406 may transmit incoming data directed to the first device 402. According to embodiments of the present disclosure, the third device 406 may do so by transmitting the data to the second device 404. This facilitates full-duplex operation by way of the second device 404 operating as a receiver for the first device 402. Thus, the incoming data may be received at the second device 404 (operating in receiver mode) generally concurrent to the first device 402 transmitting the outgoing data.

According to embodiments of the present disclosure, where both devices 402 and 404 include modems, processing of data after reception or before transmission may be split between the first and second devices 402, 404. Thus, when the second device 404 operating as a receiver for the first device 402 receives an incoming message from the third device 406, the second device 404 may first perform some level of processing on it—illustrated as action 450 in FIG. 4D.

The amount of processing may be split at the radio frequency (RF) layer, the physical (PHY) layer, the medium access control (MAC) layer, the radio link control (RLC) layer, or the packet data convergence protocol (PDCP) layer to name some examples. At action 452, the second device 404 ships the processed incoming data to the first device 402, which may perform additional processing depending on which layer the split has been set. For example, if the split occurs at the MAC layer, the second device 404 may process the incoming data down to RLC PDUs, in which form the incoming data may be shipped via a tether to first device 402. However, since the first device 402 is operating as a transmitter in the example of FIG. 4D, the modem of the first device 402 may modulate and otherwise process the outgoing data without splitting that responsibility with the second device 404. Moreover, as noted above, the first device 402 may ship the outgoing data (e.g., transmission signal) to the second device 404, so that the second device 404 may perform interference cancellation as part of its processing (at the split level determined between the two devices) before shipping the incoming data to the first device 402.

Figure 4E:
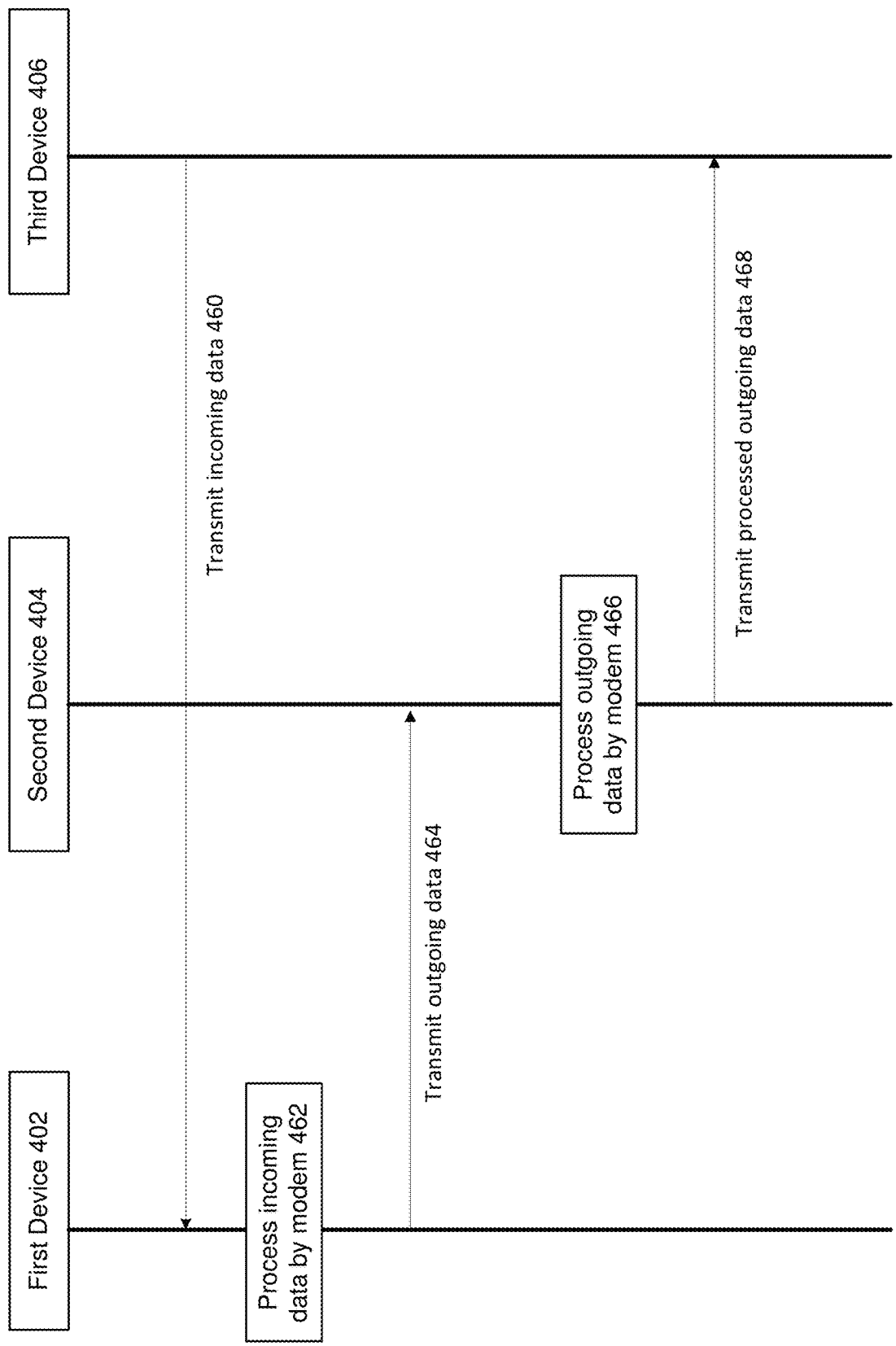
FIG. 4E illustrates a protocol diagram of a full-duplex cooperative communication scheme according to some embodiments of the present disclosure.

FIG. 4E illustrates a protocol diagram of a full-duplex cooperative communication scheme according to some embodiments of the present disclosure. In the exemplary embodiment of FIG. 4E, both the first device 402 and the second device 404 respectively include a modem. The first device 402 in the example of FIG. 4E has an application that takes advantage of the full-duplex cooperation communication scheme, with the first device 402 operating in receiver mode, and the second device 404 operating in transmitter mode. In some examples, before action 460 the first device 402 may negotiate with the second device 404 to determine whether the tethered (or soon to be tethered devices) are in a condition to engage in full-duplex communications according to embodiments of the present disclosure. This may be based, as noted above, on one or more factors including tether link quality, battery conditions, etc.

Similar to FIG. 4C, at action 460 the third device 406 transmits incoming data to the first device 402, instead of being received first at the second device 404 and then shipped via a tether from the second device 404 to the first device 402.

At action 462, the first device 402 processes the incoming data from the third device 406 with the first device 402's modem (including, for example, demodulating the data and provided it up a protocol stack to a waiting application). This may include interference cancellation as well, using the outgoing data that is shipped to the second device 404 for transmission.

At action 464, the first device 402 may transmit outgoing data to the third device 406 by first shipping the data to the second device 404 via a tether.

At action 466, the second device 404 may process the data by its modem at action 484, which may include modulating the data, before transmitting it to the third device at action 490. In some examples, all of the processing may be done by the modem of the first device 402 before shipping to the second device 404 for transmission to the third device 406. In other examples, some of the processing may be done by the modem of the first device 402, and the rest of the processing for transmission done by the modem of the second device 404 after being shipped via the tether between the two devices.

At action 468, the second device 404 transmits (in its role as transmitter according to embodiments relating to FIG. 4E) the outgoing data to the third device 406. According to embodiments of the present disclosure, the first device 402 may receive incoming data via its own antennas generally concurrent to transmission by the second device 404 of the outgoing data, to facilitate full-duplex operation.

Following from the examples of FIGS. 4D and 4E, FIGS. 5A-5E illustrate multiple devices (each having its own modem) in full-duplex cooperative communication schemes according to some embodiments of the present disclosure, and particularly different layers at which to split processing between modems of two tethered devices. The examples in these figures focus on communications between two communications devices, first device 500 and second device 520, where one operates as a transmitter and the other operates as a receiver. Because the focus is on the split of processing between the two devices, a third device with which the two devices together communicate (in full-duplex mode according to principles of the present disclosure) is not illustrated. First device 500 may be similar to first device 202a, 300a, 300c, 300e, and 402 for example, and second device 520 may be similar to second device 202b, 300b, 300d, 300f, and 404 for example. However, for simplicity of discussion, the different hardware and/or software components are not illustrated in FIGS. 5A-5E, instead focusing on illustrating aspects pertaining to splitting the modem processing between the tethered devices.

Further, in FIGS. 5A-5E, the application(s) 502 are illustrated as being resident on first device 500; this is for purposes of illustration and discussion. As both devices have a modem, the second device 520 may likewise have one or more applications with which the second device 520 engages in full-duplex communication while tethered with another device—i.e., while the operations below are described with respect to the first device 500 providing full-duplex communications for its application(s), the description may apply equally to the second device 520 operating to provide full-duplex communications to its own applications, with the first device 500 swapping places in terms of operations described above and below.

Figure 5A:
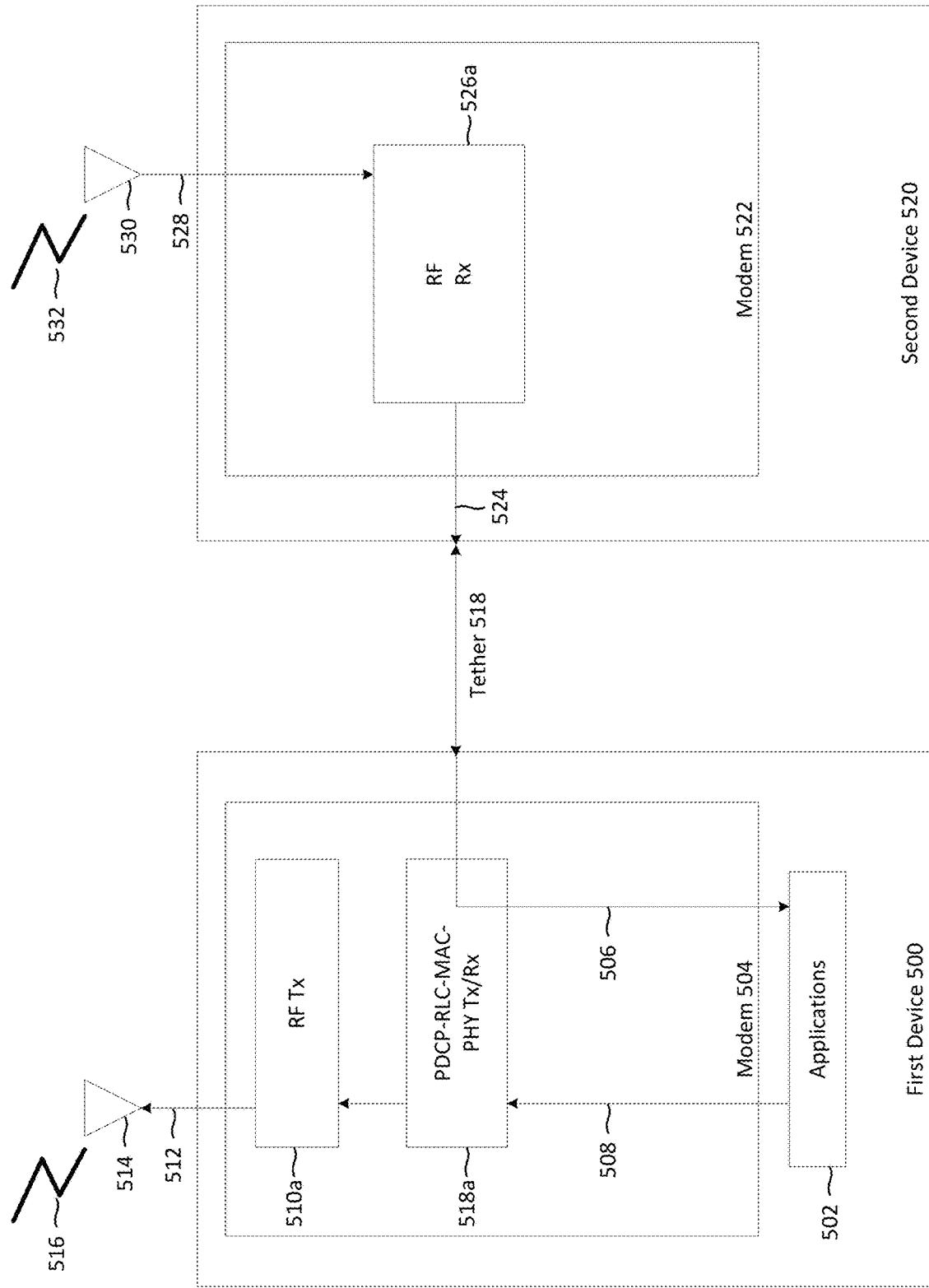
FIG. 5A illustrates a block diagram of multiple devices in full-duplex cooperative communication schemes according to some embodiments of the present disclosure.

Turning first to FIG. 5A, a block diagram is illustrated of multiple devices including first device 500 and second device 520 in full-duplex cooperative communication schemes according to some embodiments of the present disclosure. As illustrated, first device 500 includes applications 502, which represents one or more applications that are taking advantage of full-duplex communications according to embodiments of the present disclosure. While there may be multiple applications, description herein focuses on one application for simplicity of discussion.

In the illustration of FIG. 5A, the different layers at which processing of outgoing data and incoming data may occur is provided as layers 510a/518a. This is functionally illustrated with the layers at which the modem 504 (resident on the first device 500 where the application 502 is also resident) shares processing of the outgoing data 508 with incoming (processed) data 524 from the second device 520 as layers 518a. Further, the layers at which the modem 504 processes the outgoing data 508 for transmission that are not shared with the processing of incoming data 524 as layers 510a.

In the embodiment of FIG. 5A, the modem 504 processes the outgoing data and the incoming data at the PHY, MAC, RLC, and PDCP layers (these layers being exemplary, with embodiments of the present disclosure applying to more or fewer layers/different layer types). Thus, in the example of FIG. 5A the processing by modems 504 and 522 (of second device 520) is split at the RF layer.

According to the illustrated example, the application 502 provides outgoing data 508 to a modem 504 of the first device 500 (which may be part of a transceiver or separate from it, for example). At the shared layers 518a, the modem 504 processes the outgoing data 508 at the shared layers—here, PDCP, RLC, MAC, and PHY layers. The outgoing data 508 is further processed at the non-shared RF layer 510a. This is output in the illustration from the modem 504 as processed outgoing data 512. The processed outgoing data 512 is then transmitted 516 via one or more antennas 514 as part of full-duplex communications.

Concurrent to transmission, one or more antennas 530 of the second device 520 receives 532 unprocessed incoming data 528. At the second device 520, the non-shared layers at which the modem 522 of the second device 520 processes incoming data 528 is illustrated as layers 526a, which in FIG. 5A includes the RF layer. The unprocessed incoming data 528 is processed by the modem 522 at the RF layer 526a, and the processed data 524 is transmitted via tether 518 to the modem 504 of the first device 500. For example, at the RF layer the processed incoming data 524 may be in the form of IQ samples. At the modem 504 of the first device 500, the modem 504 further processes the processed incoming data 524 at the shared layers—here, PDCP, RLC, MAC, and PHY layers. The resulting processed data is illustrated as incoming data 506 which is provided to the one or more applications 502 for which the data is targeted. The one or more applications 502 providing the outgoing data 508 and receiving the incoming data 506 may be the same or different from each other.

Figure 5B:
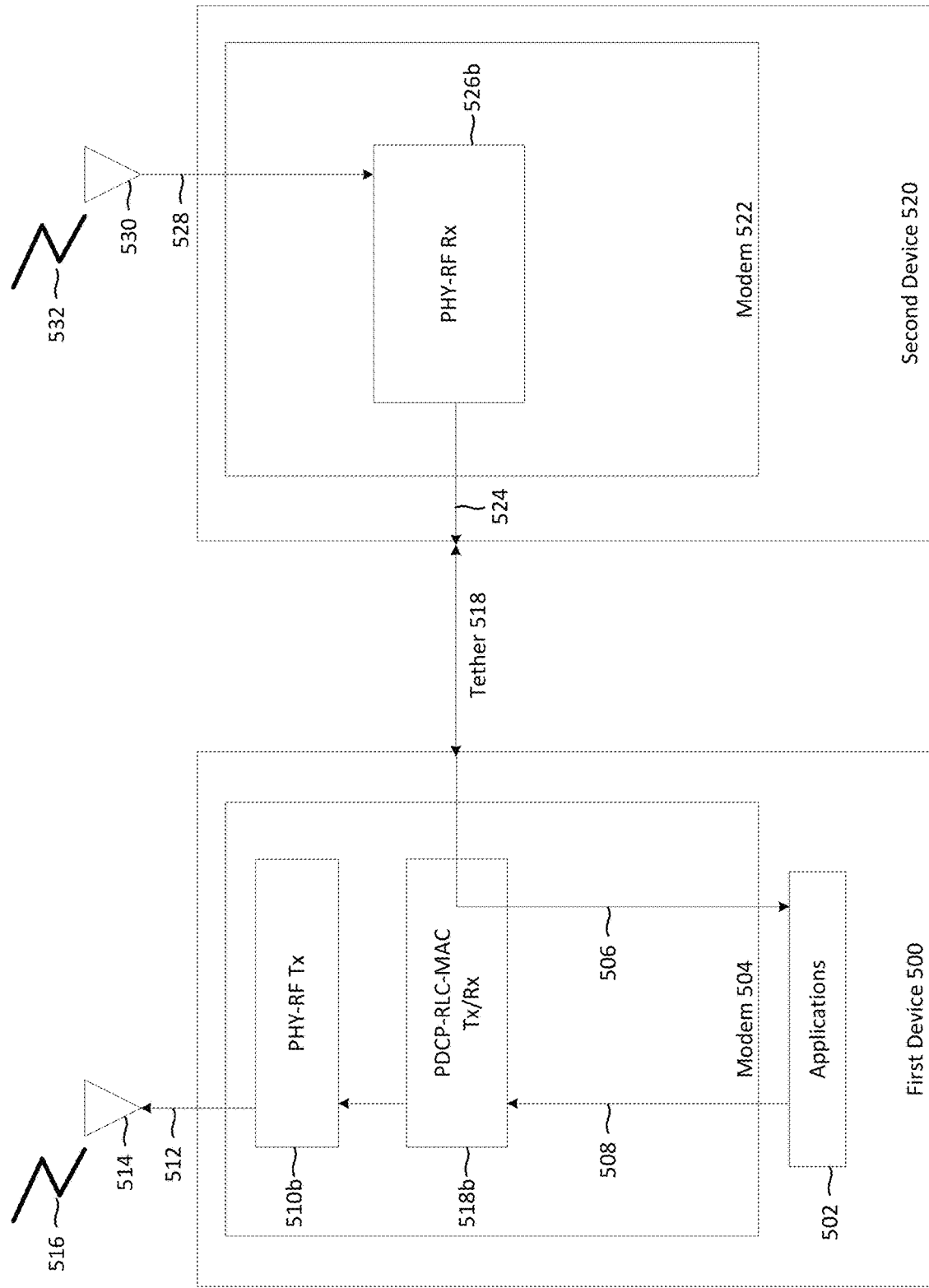
FIG. 5B illustrates a block diagram of multiple devices in full-duplex cooperative communication schemes according to some embodiments of the present disclosure.

FIG. 5B also illustrates a block diagram of multiple devices including first device 500 and second device 520 in full-duplex cooperative communication schemes according to some embodiments of the present disclosure. Shared components to those discussed with respect to FIG. 5A will not be repeated in detail here.

While in FIG. 5A the processing split between modems 504 (first device 500) and 522 (second device 520) was split at the RF layer, in FIG. 5B the split is illustrated at the PHY layer. Accordingly, the modem 504 (at the first device 500) processes the outgoing data and the incoming data at the MAC, RLC, and PDCP layers (these layers being exemplary, with embodiments of the present disclosure applying to more or fewer layers/different layer types).

According to the illustrated example, the application 502 provides outgoing data 508 to a modem 504 of the first device 500. At the shared layers 518b, the modem 504 processes the outgoing data 508 at the shared layers—here, PDCP, RLC, and MAC layers. The outgoing data 508 is further processed at the non-shared PHY and RF layers 510b. This is output in the illustration from the modem 504 as processed outgoing data 512. The processed outgoing data 512 is then transmitted 516 via one or more antennas 514 as part of full-duplex communications.

Concurrent to transmission, one or more antennas 530 of the second device 520 receives 532 unprocessed incoming data 528. At the second device 520, the non-shared layers at which the modem 522 of the second device 520 processes incoming data 528 is illustrated as layers 526b, which in FIG. 5B includes the RF and PHY layers. The unprocessed incoming data 528 is processed by the modem 522 at the RF and PHY layers 526b, and the processed data 524 is transmitted via tether 518 to the modem 504 of the first device 500. For example, at the PHY layer the processed incoming data 524 may be in the form of MAC PDUs, as well as include HARQ control information. For example, the second device 520 may generate HARQ feedback (e.g., ACK/NACK), which HARQ control information is sent via the tether 518 as well to the first device 500 for transmission out. At the modem 504 of the first device 500, the modem 504 further processes the processed incoming data 508 at the shared layers—here, MAC, RLC, and PDCP layers. The resulting processed data is illustrated as incoming data 506 which is provided to the one or more applications 502 for which the data is targeted.

Figure 5C:
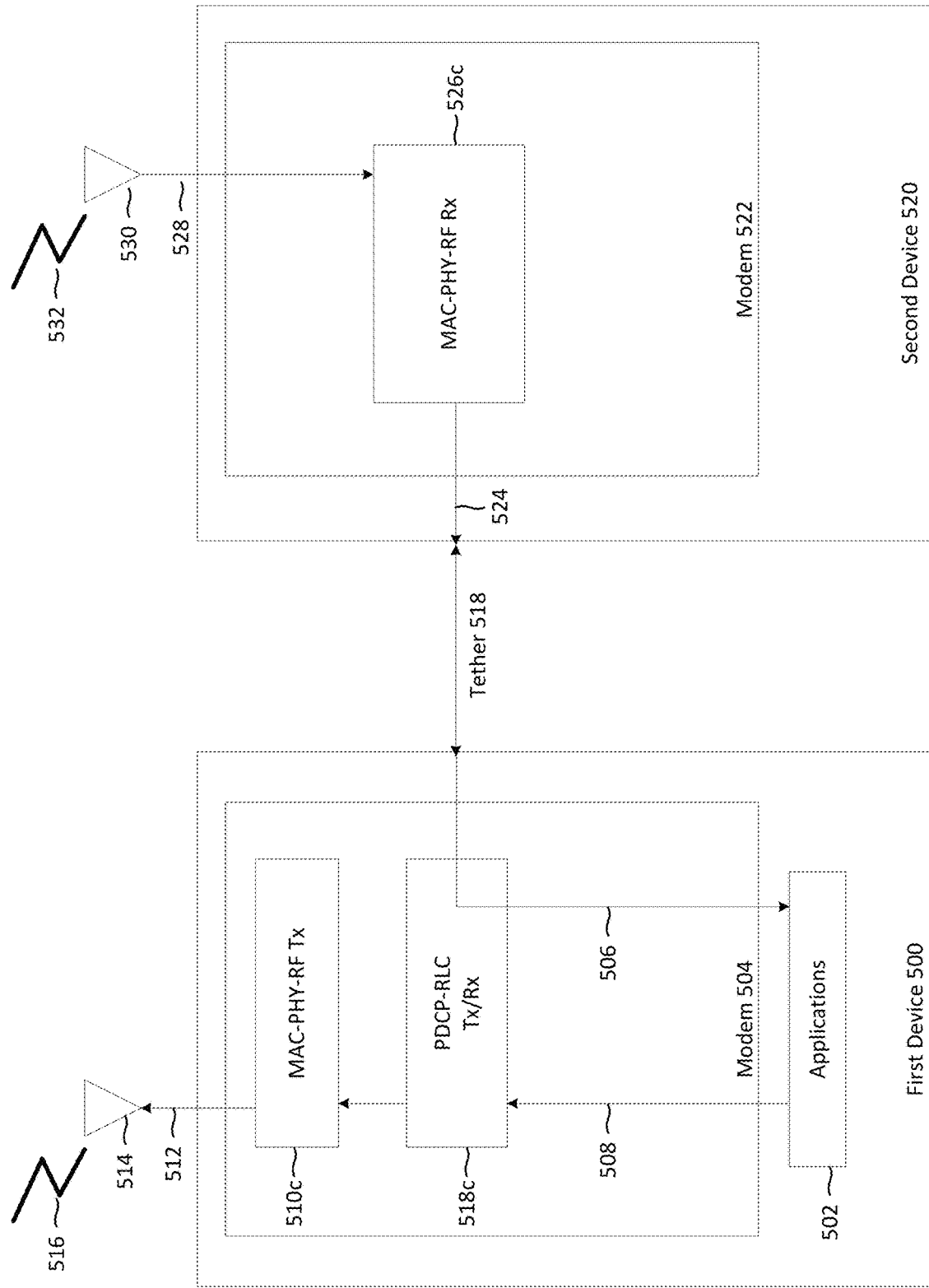
FIG. 5C illustrates a block diagram of multiple devices in full-duplex cooperative communication schemes according to some embodiments of the present disclosure.

FIG. 5C also illustrates a block diagram of multiple devices including first device 500 and second device 520 in full-duplex cooperative communication schemes according to some embodiments of the present disclosure. Shared components to those discussed with respect to FIG. 5A or 5B will not be repeated in detail here.

While in FIG. 5B the processing split between modems 504 (first device 500) and 522 (second device 520) was split at the PHY layer, in FIG. 5C the split is illustrated at the MAC layer. Accordingly, the modem 504 (at the first device 500) processes the outgoing data and the incoming data at the RLC and PDCP layers (these layers being exemplary, with embodiments of the present disclosure applying to more or fewer layers/different layer types).

According to the illustrated example, the application 502 provides outgoing data 508 to a modem 504 of the first device 500. At the shared layers 518c, the modem 504 processes the outgoing data 508 at the shared layers—here, PDCP and RLC layers. The outgoing data 508 is further processed at the non-shared MAC, PHY, and RF layers 510c. This is output in the illustration from the modem 504 as processed outgoing data 512. The processed outgoing data 512 is then transmitted 516 via one or more antennas 514 as part of full-duplex communications.

Concurrent to transmission, one or more antennas 530 of the second device 520 receives 532 unprocessed incoming data 528. At the second device 520, the non-shared layers at which the modem 522 of the second device 520 processes incoming data 528 is illustrated as layers 526c, which in FIG. 5C includes the RF, PHY, and MAC layers. The unprocessed incoming data 528 is processed by the modem 522 at the RF, PHY, and MAC layers 526c, and the processed data 524 is transmitted via tether 518 to the modem 504 of the first device 500. For example, at the MAC layer the processed incoming data 524 may be in the form of RLC PDUs, as well as include HARQ control information. At the modem 504 of the first device 500, the modem 504 further processes the processed incoming data 508 at the shared layers—here, RLC and PDCP layers. The resulting processed data is illustrated as incoming data 506 which is provided to the one or more applications 502 for which the data is targeted.

Figure 5D:
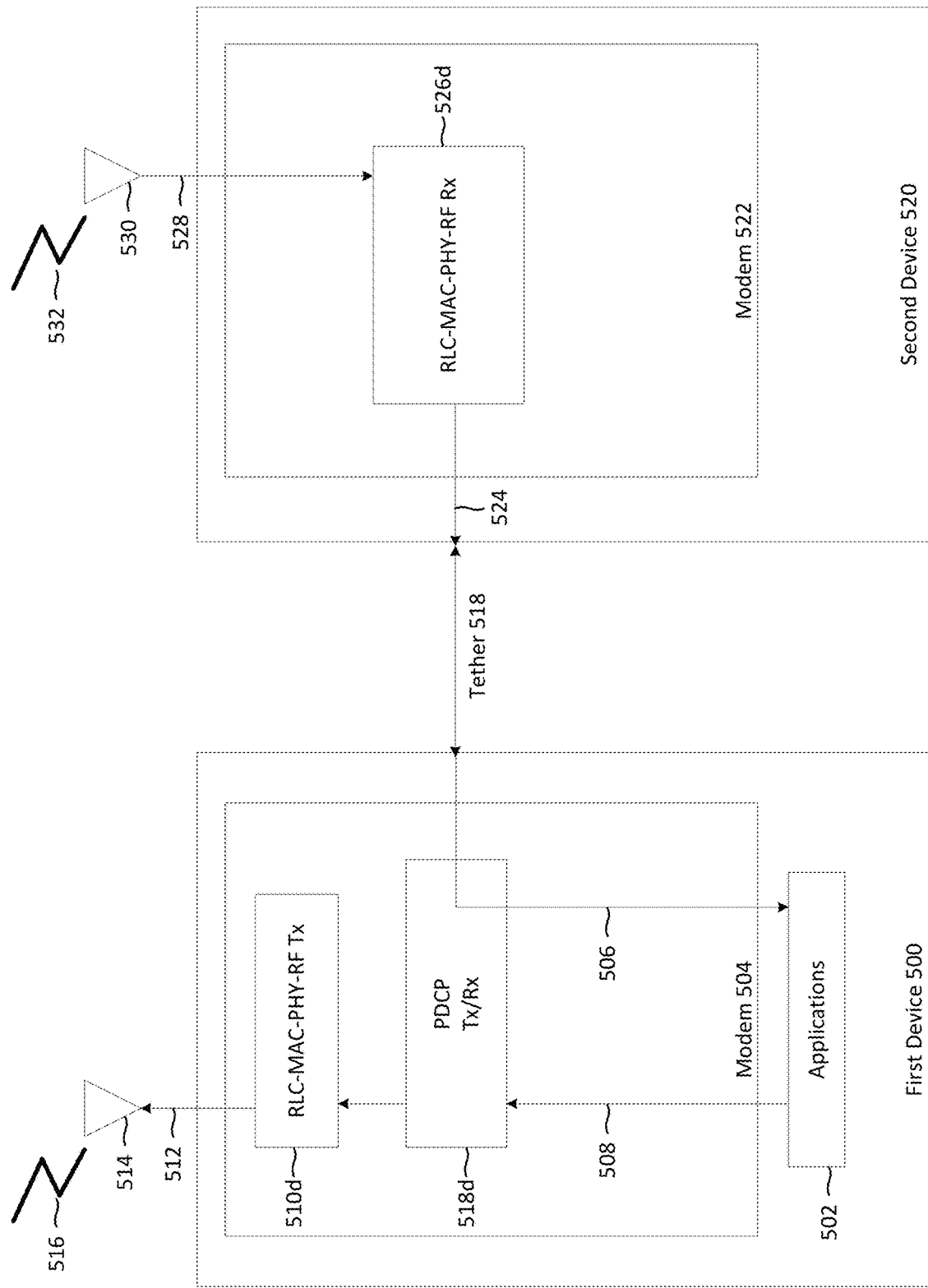
FIG. 5D illustrates a block diagram of multiple devices in full-duplex cooperative communication schemes according to some embodiments of the present disclosure.

FIG. 5D also illustrates a block diagram of multiple devices including first device 500 and second device 520 in full-duplex cooperative communication schemes according to some embodiments of the present disclosure. Shared components to those discussed with respect to FIG. 5A, 5B, or 5C will not be repeated in detail here.

While in FIG. 5C the processing split between modems 504 (first device 500) and 522 (second device 520) was split at the MAC layer, in FIG. 5D the split is illustrated at the RLC layer. Accordingly, the modem 504 (at the first device 500) processes the outgoing data and the incoming data at the PDCP layer (this layer being exemplary, with embodiments of the present disclosure applying to more or fewer layers/different layer types).

According to the illustrated example, the application 502 provides outgoing data 508 to a modem 504 of the first device 500. At the shared layers 518*d*, the modem 504 processes the outgoing data 508 at the shared layers—here, the PDCP layer. The outgoing data 508 is further processed at the non-shared RLC, MAC, PHY, and RF layers 510*d*. This is output in the illustration from the modem 504 as processed outgoing data 512. The processed outgoing data 512 is then transmitted 516 via one or more antennas 514 as part of full-duplex communications.

Concurrent to transmission, one or more antennas 530 of the second device 520 receives 532 unprocessed incoming data 528. At the second device 520, the non-shared layers at which the modem 522 of the second device 520 processes incoming data 528 is illustrated as layers 526*d*, which in FIG. 5D includes the RF, PHY, MAC, and RLC layers. The unprocessed incoming data 528 is processed by the modem 522 at the RF, PHY, MAC, and RLC layers 526*d*, and the processed data 524 is transmitted via tether 518 to the modem 504 of the first device 500. For example, at the RLC layer the processed incoming data 524 may be in the form of PDCP PDUs, as well as include RLC-HARQ control information (e.g., HARQ control feedback information generated by the PHY layer and control feedback generated by the RLC layer). At the modem 504 of the first device 500, the modem 504 further processes the processed incoming data 508 at the shared layers—here, the PDCP layer. The resulting processed data is illustrated as incoming data 506 which is provided to the one or more applications 502 for which the data is targeted.

Figure 5E:
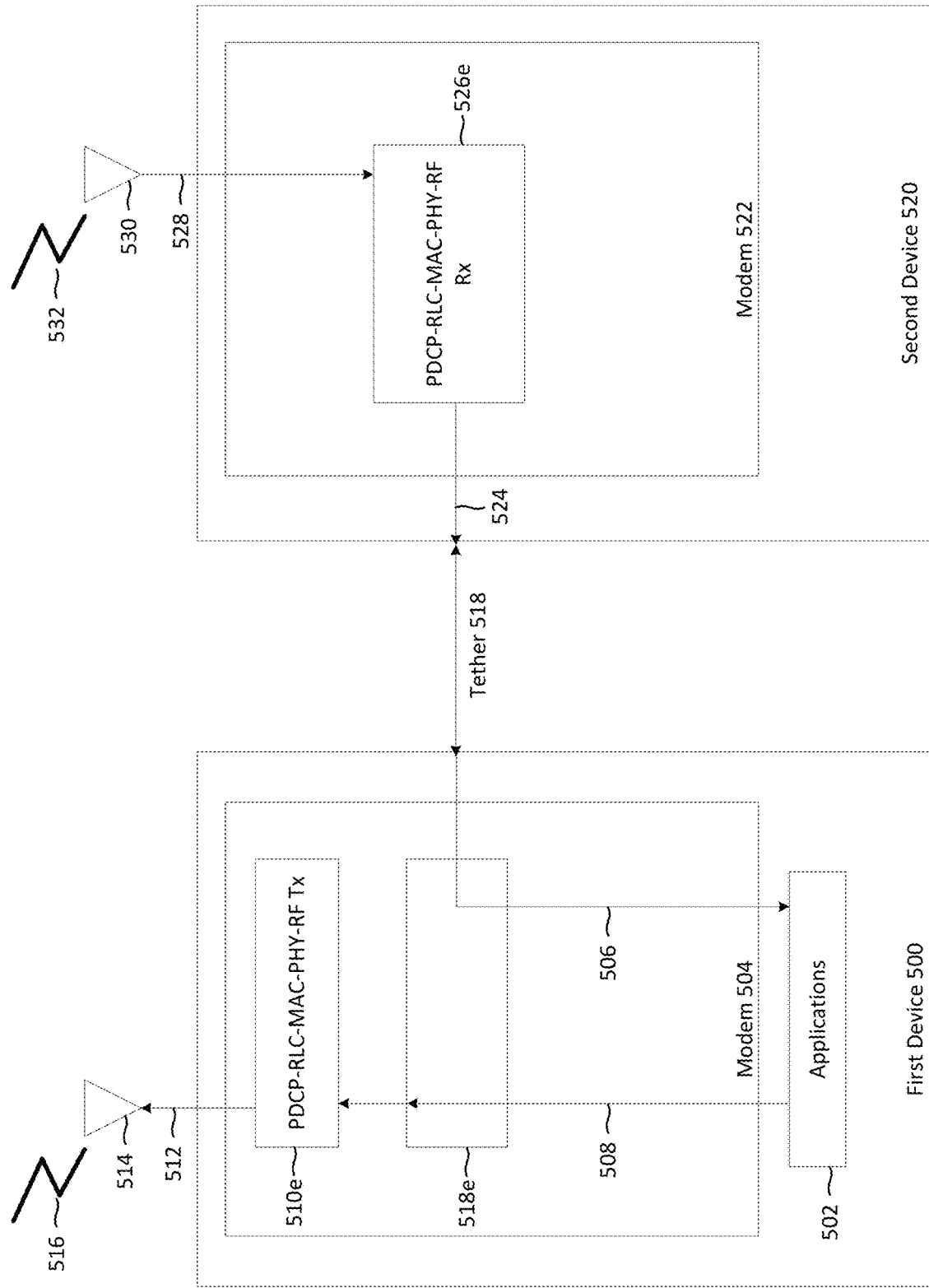
FIG. 5E illustrates a block diagram of multiple devices in full-duplex cooperative communication schemes according to some embodiments of the present disclosure.

FIG. 5E also illustrates a block diagram of multiple devices including first device 500 and second device 520 in full-duplex cooperative communication schemes according to some embodiments of the present disclosure. Shared components to those discussed with respect to FIG. 5A, 5B, 5C, or 5D will not be repeated in detail here.

While in FIG. 5D the processing split between modems 504 (first device 500) and 522 (second device 520) was split at the RLC layer, in FIG. 5E the split is illustrated at the PDCP layer. Accordingly, the modem 504 (at the first device 500) does not perform any shared processing between outgoing and incoming data at any layer.

According to the illustrated example, the application 502 provides outgoing data 508 to a modem 504 of the first device 500. At the shared layers 518*e*, the modem 504 does not process the outgoing data 508 at any shared layer. The outgoing data 508 is further processed at the non-shared PDCP, RLC, MAC, PHY, and RF layers 510*e*. This is output in the illustration from the modem 504 as processed outgoing data 512. The processed outgoing data 512 is then transmitted 516 via one or more antennas 514 as part of full-duplex communications.

Concurrent to transmission, one or more antennas 530 of the second device 520 receives 532 unprocessed incoming data 528. At the second device 520, the non-shared layers at which the modem 522 of the second device 520 processes incoming data 528 is illustrated as layers 526*e*, which in FIG. 5E includes the RF, PHY, MAC, RLC, and PDCP layers. The unprocessed incoming data 528 is processed by the modem 522 at the RF, PHY, MAC, RLC, and PDCP layers 526*e*, and the processed data 524 is transmitted via tether 518 to the modem 504 of the first device 500. For example, at the PDCP layer the processed incoming data 524 may be in the form of internet protocol (IP) packets, as well as include PDCP-RLC-HARQ control (e.g., HARQ control feedback such as ACK/NACK generated by the PHY layer, as well as control feedback generated by the RLC and PDCP layers). At the modem 504 of the first device 500, the modem 504 has no further processing to perform because there are no shared layers. The resulting processed data is illustrated as incoming data 506 which is provided to the one or more applications 502 for which the data is targeted.

Figure 6A:
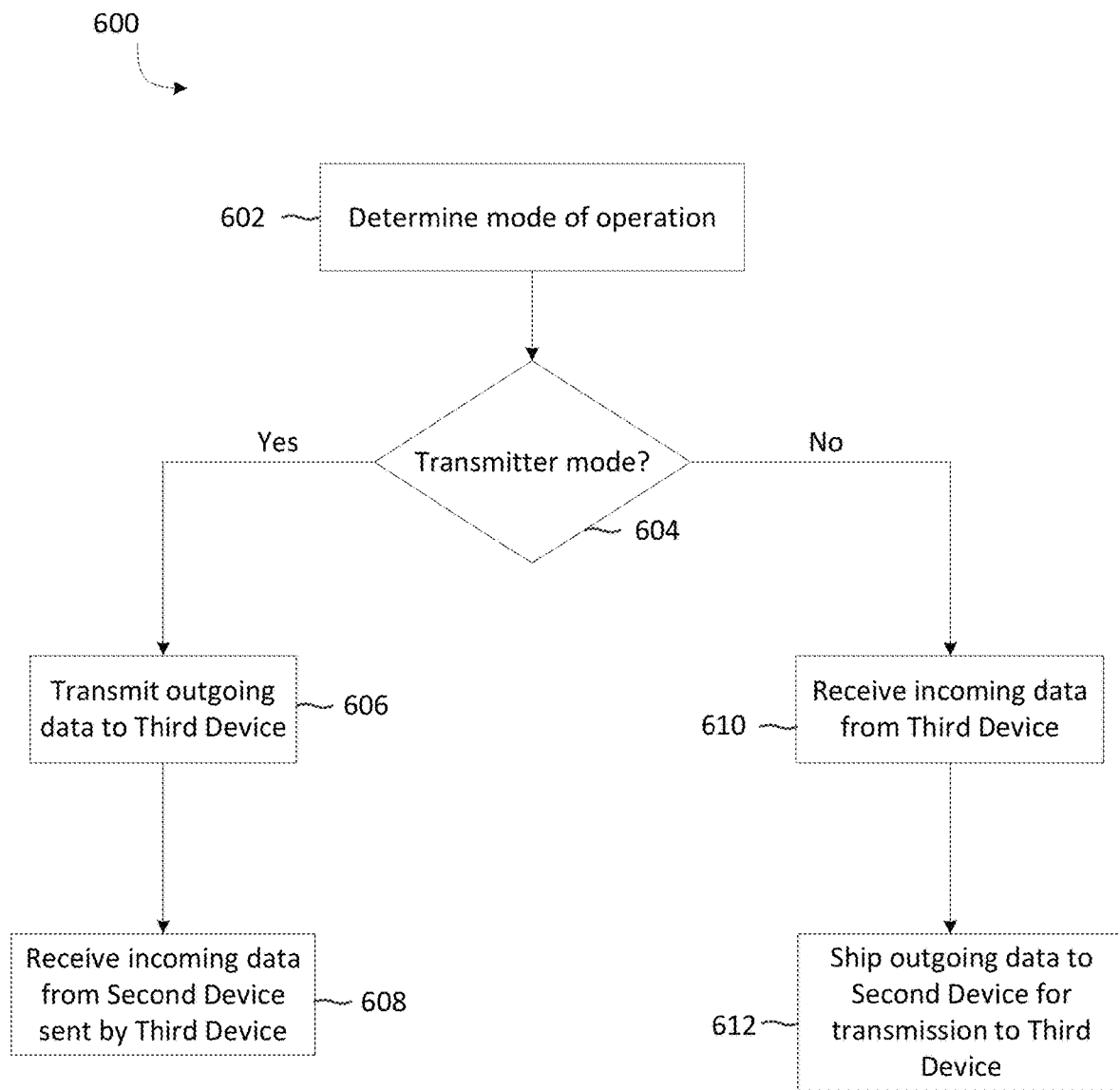
FIG. 6A illustrates a flow diagram of a wireless communication method according to some embodiments of the present disclosure.

FIG. 6A illustrates a flow diagram of a wireless communication method 600 according to some embodiments of the present disclosure. Aspects of method 600 may be executed by a wireless communication device, such as the various UEs 115 of FIG. 1, the first devices 202*a*, 300*a*, 300*c*, 300*e*, 402, and 500, and/or second devices 202*b*, 300*b*, 300*d*, 300*f*, 404, and 520, utilizing one or more components, such as processor 204, memory 206, communication module 210, transceiver 212, the one or more antennas 218, and various combinations thereof. As illustrated, the method 600 includes a number of enumerated steps, but embodiments of the method 600 may include additional steps before, during, after, and in between the enumerated steps. For example, in some instances one or more aspects of methods 616, 630, 650, 670 may be implemented as part of method 600. Further, in some embodiments, one or more of the enumerated steps may be omitted or performed in a different order.

At block 601, a first device (e.g., first device 202*a* from the example of FIG. 2) determines whether it is ready to operate in full-duplex communication in cooperation with a second device (e.g., second device 202*b* of FIG. 2) via a tether. Thus, prior to this determination (or concurrent to it) the first device 202*a* may engage in establishing a tether with the second device 202*b*. The determination may be based on one or more factors, including for example a tether link quality between the first device 202*a* and the second device 202*b* (e.g., a better link quality increasing the likelihood of determining to establish full-duplex communications, etc.), a battery condition of one or both tethered devices, etc.

At block 602, the first device 202*a* determines which mode of operation it will use when cooperating with a second device (e.g., second device 202*b* of FIG. 2) via a tether between the first and second devices 202*a*, 202*b* to establish full-duplex communications with a third device, such as a base station 240 of FIG. 2, on behalf of an application operating on the first device 202*a*. The first device 202*a* may determine to operate in transmitter mode, where the first device 202*a* may transmit messages to the third device 240 via its own antennas without shipping outgoing data to the second device 202*b* for transmission, and rely on the second device 202*b* to receive incoming data from the third device 240. Alternatively, the first device 202*a* may determine to operate in receiver mode, where the first device 202*a* may receive messages from the third device 240 via its own antennas, without having the received data shipped from the second device 202*b*. In this receiver mode, the first device 202*a* may rely on the second device 202*b* to transmit messages to the third device (e.g., by shipping as discussed further below).

The determination of whether to operate as a transmitter or receiver may depend on any number of factors or combination of factors. For example, the determination may be made based on interference, with the first device 202*a* determining whether operating as a transmitter or receiver would better reduce the amount of self-interference between tethered first device 202*a* and second device 202*b*. In some examples, in order to reduce the amount of self-interference, the device with lesser transmit power may be chosen as the transmitter. This may be done, for example, in order to minimize the amount of self-interference to avoid the transmitter drowning out the capabilities of the receiver. As another example, the first device 402 may determine whether to operate as transmitter or receiver (and the second device 404 as receiver or transmitter, respectively) based on a measured interference level. Other example metrics include quality of service, bitrate, throughput, signal-to-noise ratio (SNR), a signal-to-interference-plus-noise ratio (SINR), reference signal received power (RSRP), a reference signal received quality (RSRQ), a received signal strength indicator (RSSI), to name just a few examples.

At decision block 604, if the first device 202a determined at block 602 to operate in transmitter mode, the method 600 proceeds to block 606.

At block 606, the first device 202a may transmit data to the third device 240 without relying upon the second device 202b for transmission.

At block 608, the first device 202a may receive incoming data from the second device 202b, where the second device 202b received the incoming data from a third device 240. In other words, the third device 240 may first transmit the incoming data to the second device 202b while the second device 202b is operating in full-duplex cooperation with the first device 202a on behalf of an application operating on the first device 202a. The second device 202b may, upon receipt of this incoming data, ship the incoming data to the first device 202a via a tether. Further, the first device 202a may perform interference cancellation on the incoming data shipped from the second device 202b, based on the outgoing data.

While blocks 606 and 608 are illustrated sequentially for simplicity, the second device 202b may receive incoming data substantially concurrently to the first device 202a transmitting outgoing data to operate in full-duplex mode according to embodiments of the present disclosure.

Returning to decision block 604, if instead the first device 202a has determined to operate in receiver mode, the method 600 proceeds to block 610.

At block 610, the first device 202a may receive incoming data from a third device 240 without relying upon the second device 202b for reception. Further, the first device 202a may perform interference cancellation on the incoming data, based on the outgoing data that is shipped to the second device 202b for transmission to the third device 240.

At block 612, the first device 202a may transmit outgoing data to the third device 240 by shipping the data to the second device 202b via a tether, which the second device 202b will transmit to the third device 240. While blocks 610 and 612 are illustrated sequentially for simplicity, the first device 202a may receive incoming data substantially concurrently to the second device 202b transmitting outgoing data to operate in full-duplex mode according to embodiments of the present disclosure.

Figure 6B:
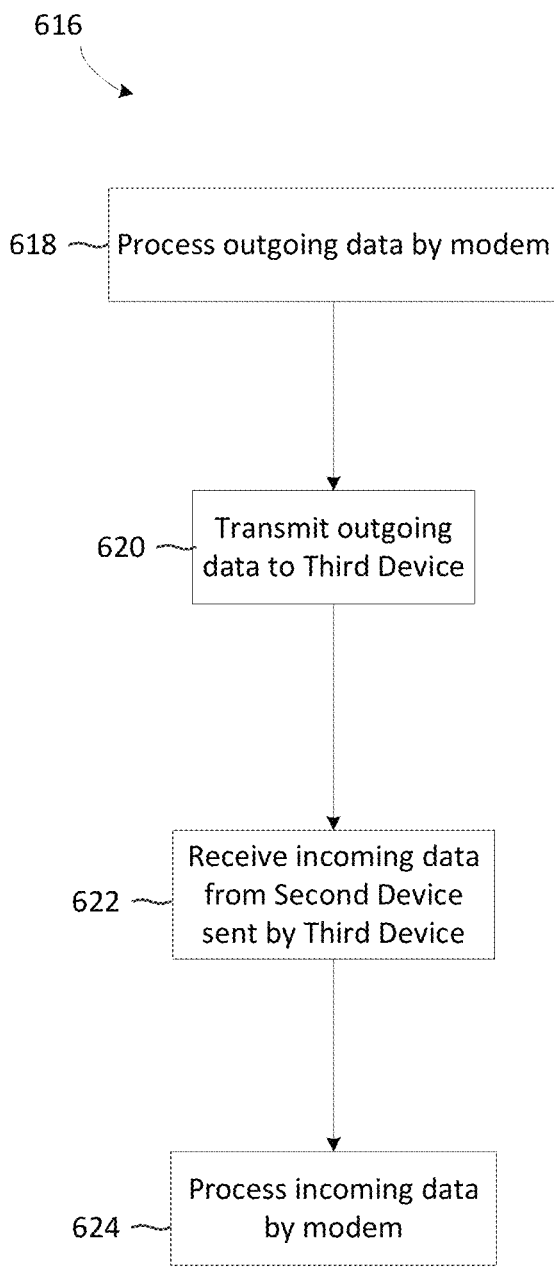
FIG. 6B illustrates a flow diagram of a wireless communication method according to some embodiments of the present disclosure.

FIG. 6B illustrates a flow diagram of a wireless communication method 616 according to some embodiments of the present disclosure. Aspects of method 616 may be executed by a wireless communication device, such as the various UEs 115 of FIG. 1, the first devices 202a, 300a, 300c, 300e, 402, and 500, and/or second devices 202b, 300b, 300d, 300f, 404, and 520, utilizing one or more components, such as processor 204, memory 206, communication module 210, transceiver 212, the one or more antennas 218, and various combinations thereof. As illustrated, the method 616 includes a number of enumerated steps, but embodiments of the method 616 may include additional steps before, during, after, and in between the enumerated steps. For example, in some instances one or more aspects of methods 600, 630, 650, 670 may be implemented as part of method 616. Further, in some embodiments, one or more of the enumerated steps may be omitted or performed in a different order.

The method 616 shown in FIG. 6B assumes a first device (e.g., first device 202a from FIG. 2) in transmitter mode having a modem, in full-duplex cooperative communication with a second device (e.g., second device 202a) either lacking a modem or having a modem which is inactive for purposes of the method 616.

At block 618, the first device 202a uses its modem to process outgoing data intended for a third device (e.g., third device 240 of FIG. 2), which may include for example modulating the outgoing data. In some examples, the first device 202a may be pre-provisioned to operate as a transmitter while another device tethered to the first device 202a operates as a receiver in full-duplex communications. In other examples, the first device 202a may transition between operating as a receiver and a transceiver in full-duplex communication using a tethered device, depending upon factors including transmit power changes, channel condition changes, etc.

At block 620, the first device 202a transmits the outgoing data with its own one or more antennas to the third device 240. The first device 202a may do so without relying upon a second device to which the first device 202a is tethered, e.g. second device 202b, for transmission.

At block 622, the first device 202a receives incoming data originating from the third device 240 via shipping from the second device 202b. In other words, the first device 202a receives the incoming data from the second device 202b, while tethered with the first device 202a and operating as a receiver, upon the second device 202b receiving the incoming data from the third device 240. While blocks 620 and 622 are illustrated sequentially for simplicity, the second device 202b may receive incoming data substantially concurrently to the first device 202a transmitting outgoing data to operate in full-duplex mode according to embodiments of the present disclosure.

At block 624, the first device 202a further processes the incoming data by the first device 202a's modem, and the demodulated/processed data is provided to the application(s) on the first device 202a for which it was intended. The processing may include, for example, interference cancellation on the incoming data shipped from the second device 202b, based on the outgoing data.

Figure 6C:
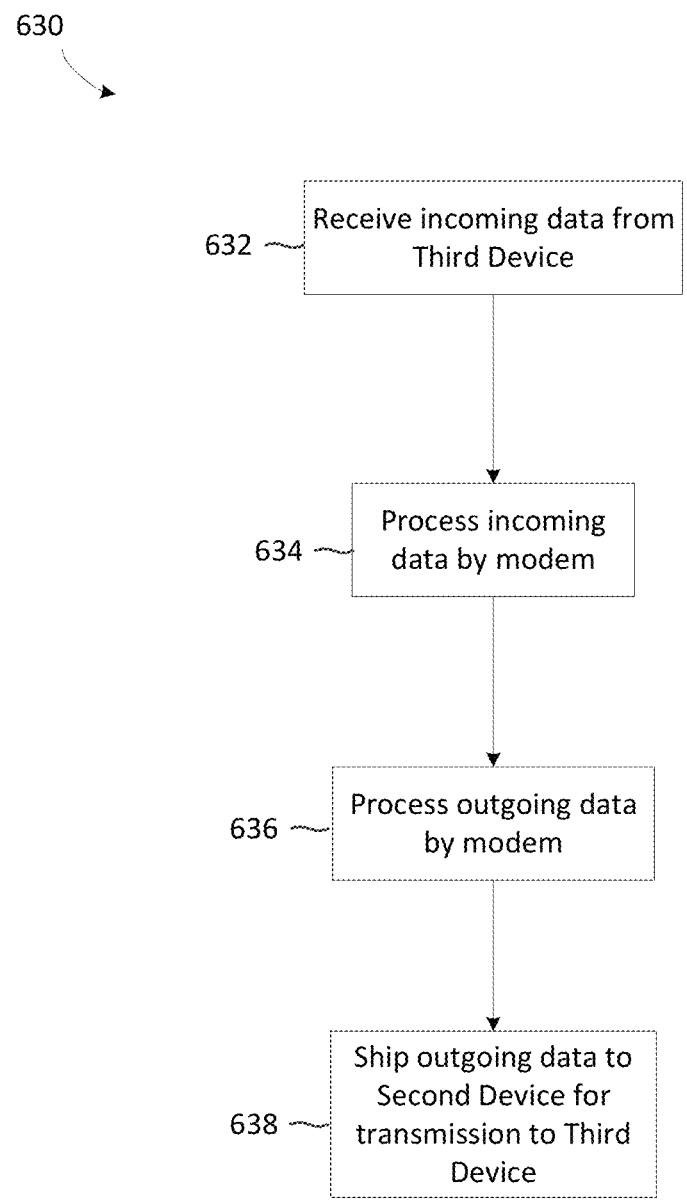
FIG. 6C illustrates a flow diagram of a wireless communication method according to some embodiments of the present disclosure.

FIG. 6C illustrates a flow diagram of a wireless communication method 630 according to some embodiments of the present disclosure. Aspects of method 630 may be executed by a wireless communication device, such as the various UEs 115 of FIG. 1, the first devices 202a, 300a, 300c, 300e, 402, and 500, and/or second devices 202b, 300b, 300d, 300f, 404, and 520, utilizing one or more components, such as processor 204, memory 206, communication module 210, transceiver 212, the one or more antennas 218, and various combinations thereof. As illustrated, the method 630 includes a number of enumerated steps, but embodiments of the method 630 may include additional steps before, during, after, and in between the enumerated steps. For example, in some instances one or more aspects of methods 600, 616, 650, 670 may be implemented as part of method 630. Further, in some embodiments, one or more of the enumerated steps may be omitted or performed in a different order.

The method 630 shown in FIG. 6C assumes a first device (e.g., first device 202a from FIG. 2) in receiver mode having a modem, in full-duplex cooperative communication with a second device (e.g., second device 202b from FIG. 2) either lacking a modem or having a modem which is inactive for purposes of the method.

At block 632, the first device 202a receives incoming data from a third device (e.g., third device 240 of FIG. 2). In some examples, the first device 202a may be pre-provisioned to operate as a receiver while another device tethered to the first device 202a operates as a transmitter in full-duplex communications. In other examples, the first device 202a may transition between operating as a transmitter and receiver in full-duplex communication using a tethered device, depending upon factors including transmit power changes, channel condition changes, etc.

At block 634, the first device 202a uses its modem to process incoming data from the third device 240, which may include for example demodulating the incoming data. The demodulated/processed data is provided to the application(s) on the first device 202a for which it was intended. Further, the first device 202a may perform interference cancellation on the incoming data, based on the outgoing data that is shipped to the second device 202b for transmission to the third device 240.

At block 636, the first device 202a processes outgoing data provided by the application(s) intended for the third device by the modem of the first device 202a. This may include, for example, modulating the outgoing data.

At block 638, the first device 202a ships the outgoing data (after processing at block 636) via a tether to second device 202b for transmission to the third device 240. According to embodiments of the present disclosure, the shipped data is transmitted by the second device 202b to the third device 240 on behalf of first device 202a to achieve full-duplex communication between the application(s) of the first device 202a and the third device 240. While blocks 632 and 638 are illustrated sequentially for simplicity, the first device 202a may receive incoming data from third device 240 substantially concurrently to the second device 202b transmitting outgoing data to third device 240 to operate in full-duplex mode according to embodiments of the present disclosure.

Figure 6D:
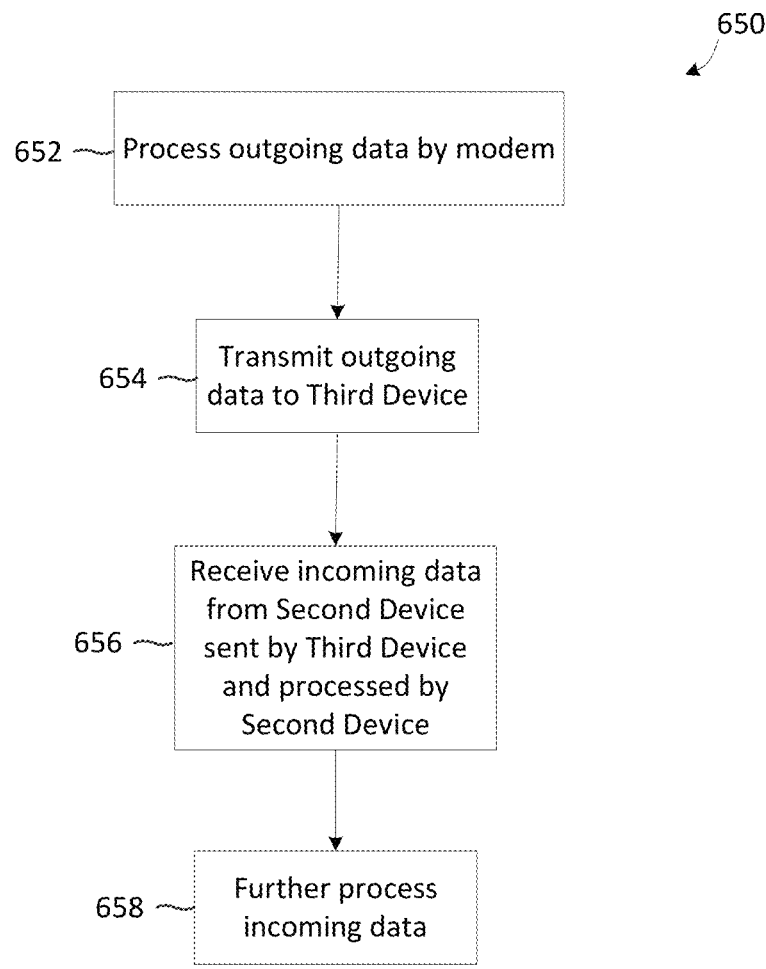
FIG. 6D illustrates a flow diagram of a wireless communication method according to some embodiments of the present disclosure.

FIG. 6D illustrates a flow diagram of a wireless communication method 650 according to some embodiments of the present disclosure. Aspects of method 650 may be executed by a wireless communication device, such as the various UEs 115 of FIG. 1, the first devices 202a, 300a, 300c, 300e, 402, and 500, and/or second devices 202b, 300b, 300d, 300f, 404, and 520, utilizing one or more components, such as processor 204, memory 206, communication module 210, transceiver 212, the one or more antennas 218, and various combinations thereof. As illustrated, the method 650 includes a number of enumerated steps, but embodiments of the method 650 may include additional steps before, during, after, and in between the enumerated steps. For example, in some instances one or more aspects of methods 600, 616, 630, 670 may be implemented as part of method 650. Further, in some embodiments, one or more of the enumerated steps may be omitted or performed in a different order.

The method shown in FIG. 6D assumes a first device (e.g., first device 202a) in transmitter mode in full-duplex cooperative communication with a second device (e.g., second device 202b), with both devices having a respective modem that may operate at some level in a split configuration (e.g., at some layer as illustrated in one of the examples from FIGS. 5A-5E and discussed herein).

At block 652, the first device 202a processes outgoing data intended for a third device (e.g., third device 240 in FIG. 2) by the modem of first device 202a, which may include modulating the data.

At block 654, the first device 202a transmits the processed outgoing data to the third device 240. Further, the first device 202a may ship the outgoing data to the second device 202a so that the second device 202b may perform interference cancellation on the incoming data, depending on the layer at which processing is split.

At block 656, the first device 202a receives incoming data originating from the third device 240 via shipping from the second device 202b. In other words, the first device 202a receives the incoming data from the second device 202b, while tethered with the first device 202a and operating as a receiver, upon the second device 202b receiving the incoming data from the third device 240. In some embodiments, the incoming data received via tether from the second device 202b may have processed at some layer by the modem of the second device 202b before shipping to the first device 202a. For example, the second device 202b may have processed the incoming data at the RF, PHY, MAC, RLC, and/or PDCP layers before shipping according to various embodiments of the present disclosure.

While blocks 654 and 656 are illustrated sequentially for simplicity, the second device 202b may receive incoming data substantially concurrently to the first device 202a transmitting outgoing data to operate in full-duplex mode according to embodiments of the present disclosure.

At block 658, where some of the processing of the incoming data was not performed by the second device 202b, the first device 202a may further process the incoming data by its modem to obtain the demodulated/processed data that is provided to the application(s) on the first device 202a for which it was intended.

Figure 6E:
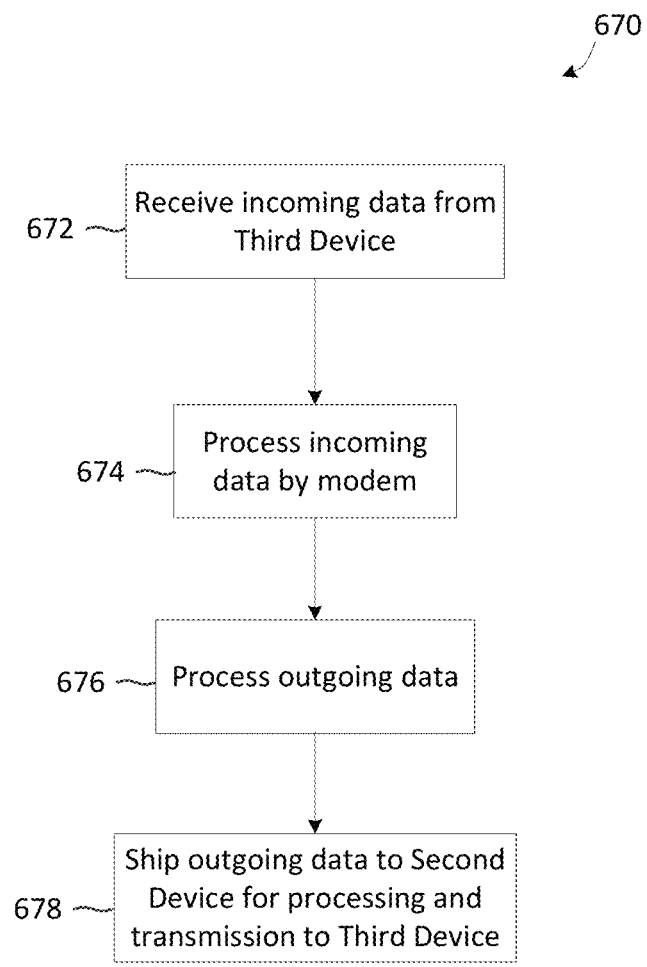
FIG. 6E illustrates a flow diagram of a wireless communication method according to some embodiments of the present disclosure.

FIG. 6E illustrates a flow diagram of a wireless communication method 670 according to some embodiments of the present disclosure. Aspects of method 670 may be executed by a wireless communication device, such as the various UEs 115 of FIG. 1, the first devices 202a, 300a, 300c, 300e, 402, and 500, and/or second devices 202b, 300b, 300d, 300f, 404, and 520, utilizing one or more components, such as processor 204, memory 206, communication module 210, transceiver 212, the one or more antennas 218, and various combinations thereof. As illustrated, the method 670 includes a number of enumerated steps, but embodiments of the method 670 may include additional steps before, during, after, and in between the enumerated steps. For example, in some instances one or more aspects of methods 600, 616, 630, 650 may be implemented as part of method 670. Further, in some embodiments, one or more of the enumerated steps may be omitted or performed in a different order.

The method shown in FIG. 6E assumes a first device (e.g., first device 202a) in receiver mode in full-duplex cooperative communication with a second device (e.g., second device 202b), with both devices having a respective modem that may operate at some level in a split configuration (e.g., at some layer as illustrated in one of the examples from FIGS. 5A-5E and discussed herein).

At block 672, the first device 202a receives incoming data from a third device, e.g. third device 240 in the example of FIG. 2.

At block 674, the first device 202a uses its modem to process incoming data from the third device 240, which may include for example demodulating the incoming data. The demodulated/processed data is provided to the application(s) on the first device 202a for which it was intended. Further, the first device 202*a* may perform interference cancellation on the incoming data, based on the outgoing data that is shipped to the second device 202*b* for transmission to the third device 240.

At block 676, the first device 202*a* may process outgoing data at some layer before shipping the outgoing data via tether to the second device 202*b* for further processing (if applicable) and transmission to the third device 240. For example, the first device 202*a* may processed the outgoing data (at block 676) at the PDCP, RLC, MAC, PHY, and/or RF layers before shipping to the second device 202*b* according to various embodiments of the present disclosure. Where no processing is performed by the first device 202*a* before shipping, the method 670 may proceed from block 674 to block 678.

At block 678, the first device 202*a* ships the outgoing data intended for the third device 240 to the second device 202*b*, which further processes the data by its modem (e.g., at the layers not processed by the modem at first device 202*a* before shipping). While blocks 672 and 678 are illustrated sequentially for simplicity, the first device 202*a* may receive incoming data substantially concurrently to the second device 202*b* transmitting outgoing data to operate in full-duplex mode according to embodiments of the present disclosure.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Examples of the present disclosure may include the following clauses:

1. A method for wireless communication comprising:
   determining, by a first wireless communications device connected via a tether to a second wireless communications device, whether to operate in cooperation with the second wireless communications device in full-duplex communication, the full-duplex communication comprising transmitting outgoing data simultaneously to receiving incoming data;
   transmitting, by the first wireless communications device in response to determining to operate in full duplex communication, the outgoing data to a third wireless communications device, wherein the first wireless communications device functions as a transmitter to the third wireless communications device and the second wireless communications device as a receiver from the third wireless communications device; and
   receiving, by the first wireless communications device in response to the determining to operate in full duplex communication, the incoming data via the tether received at the second wireless communications device from the third wireless communications device.

2. The method of clause 1, wherein the tether comprises a universal serial bus (USB) connection.

3. The method of clause 1, wherein the tether comprises at least one of a sidelink connection, a Bluetooth connection, or a Wi-Fi connection.

4. The method of any of clauses 1 to 3, further comprising:
   processing, by a modem of the first wireless communications device, the outgoing data,
   wherein the incoming data comprises processed data by a modem of the second wireless communications device.

5. The method of any of clauses 1 to 4, wherein the processed data comprises radio frequency (RF) layer data from the modem of the second wireless communications device.

6. The method of any of clauses 1 to 4, wherein the processed data comprises physical layer data from the modem of the second wireless communications device.

7. The method of any of clauses 1 to 3, further comprising:
   processing, by a modem of the first wireless communications device, the outgoing data and the incoming data.

8. The method of any of clauses 1 to 7, further comprising:
   determining, by the first wireless communications device, to operate as the transmitter in full duplex communication with the second wireless communications device, based on a first transmit power of the first wireless communications device being less than a second transmit power of the second wireless communications device.

9. A method for wireless communication comprising:
   determining, by a first wireless communications device connected via a tether to a second wireless communications device, whether to operate in cooperation with the second wireless communications device in full-duplex communication, the full-duplex communication comprising transmitting outgoing data simultaneously to receiving incoming data;
   receiving, by the first wireless communications device in response to determining to operate in full duplex communication, incoming data from a third wireless communications device, wherein the first wireless communications device functions as a receiver from the third wireless communications device and the second wireless communications device as a transmitter to the third wireless communications device; and transmitting, by the first wireless communications device in response to the determining to operate in full duplex communication, the outgoing data via the tether to the second wireless communications device for transmission to the third wireless communications device concurrent to the receiving.

10. The method of clause 9, wherein the tether comprises a universal serial bus (USB) connection.

11. The method of clause 9, wherein the tether comprises at least one of a sidelink connection, a Bluetooth connection, or a Wi-Fi connection.

12. The method of any of clauses 9 to 11, further comprising:
 processing, by a modem of the first wireless communications device, the outgoing data and the incoming data.

13. The method of any of clauses 9 to 12, wherein the processed outgoing data comprises radio frequency (RF) layer data from the modem of the first wireless communications device.

14. The method of any of clauses 9 to 12, wherein the processed outgoing data comprises physical layer data from the modem of the first wireless communications device.

15. The method of any of clauses 9 to 11, further comprising:
 processing, by a modem of the first wireless communications device, the incoming data,
 wherein the outgoing data comprises unprocessed data processed by a modem of the second wireless communications device prior to the transmission to the third wireless communications device.

16. The method of any of clauses 9 to 15, further comprising:
 determining, by the first wireless communications device, to operate as the receiver in full duplex communication with the second wireless communications device, based on a first transmit power of the first wireless communications device being greater than a second transmit power of the second wireless communications device.

17. A wireless communications device comprising:
 a processor configured to determine whether to operate in cooperation with a second wireless communications device in full-duplex communication, the full-duplex communication comprising transmitting outgoing data simultaneously to receiving incoming data; and
 a transceiver configured to:
  transmit, in response to determining to operate in full duplex communication, the outgoing data to a third wireless communications device, wherein the wireless communications device functions as a transmitter to the third wireless communications device and the second wireless communications device acting as a receiver from the third wireless communications device; and
  receive, via a tether in response to the determining to operate in full duplex communication, the incoming data received at the second wireless communications device from the third wireless communications device.

18. The wireless communications device of clause 17, wherein the tether comprises a universal serial bus (USB) connection.

19. The wireless communications device of clause 17, wherein the tether comprises at least one of a sidelink connection, a Bluetooth connection, or a Wi-Fi connection.

20. The wireless communications device of any of clauses 17 to 19, further comprising: a modem configured to process the outgoing data, wherein the incoming data comprises processed data by a modem of the second wireless communications device.

21. The wireless communications device of any of clauses 17 to 20, wherein the processed data comprises radio frequency (RF) layer data from the modem of the second wireless communications device.

22. The wireless communications device of any of clauses 17 to 20, wherein the processed data comprises physical layer data from the modem of the second wireless communications device.

23. The wireless communications device of any of clauses 17 to 19, further comprising: a modem configured to process the outgoing data and the incoming data.

24. A wireless communications device comprising:
 a processor configured to determine whether to operate in cooperation with a second wireless communications device in full-duplex communication, the full-duplex communication comprising transmitting outgoing data simultaneously to receiving incoming data; and
 a transceiver configured to:
  receive, in response to determining to operate in full duplex communication, incoming data from a third wireless communications device, wherein the wireless communications device functions as a receiver from the third wireless communications device and the second wireless communications device as a transmitter to the third wireless communications device; and
  transmit, in response to the determining to operate in full duplex communication, outgoing data via the tether to the second wireless communications device for transmission to the third wireless communications device concurrent to the receiving.

25. The wireless communications device of clause 24, wherein the tether comprises a universal serial bus (USB) connection.

26. The wireless communications device of clause 24, wherein the tether comprises at least one of a sidelink connection, a Bluetooth connection, or a Wi-Fi connection.

27. The wireless communications device of any of clauses 24 to 26, further comprising:
 a modem configured to process the outgoing data and the incoming data.

28. The wireless communications device of any of clauses 24 to 27, wherein the processed outgoing data comprises radio frequency (RF) layer data from the modem of the wireless communications device.

29. The wireless communications device of any of clauses 24 to 27, wherein the processed outgoing data comprises physical layer data from the modem of the wireless communications device.

30. The wireless communications device of any of clauses 24 to 29, further comprising:
 a modem configured to process the incoming data,
 wherein the outgoing data comprises unprocessed data processed by a modem of the second wireless communications device prior to the transmission to the third wireless communications device.

Further embodiments of the present disclosure include a method for wireless communication comprising determining, by a first wireless communications device connected via a tether to a second wireless communications device, whether to operate in cooperation with the second wireless communications device in full-duplex communication, the full-duplex communication comprising transmitting outgoing data simultaneously to receiving incoming data; determining, by the first wireless communications device in response to determining to operate in full-duplex communication, whether to operate in a first mode of full-duplex communication or a second mode of full-duplex communication; transmitting, by the first wireless communications device in response to determining to operate in the first mode, the outgoing data to a third wireless communications device, wherein the first mode comprises the first wireless communications device as a transmitter to the third wireless communications device and the second wireless communications device as a receiver from the third wireless communications device; and receiving, by the first wireless communications device in response to the determining to operate in the first mode, the incoming data via the tether received at the second wireless communications device from the third wireless communications device.

The method may also include wherein the tether comprises a wired connection. The method may also include wherein the wired connection comprises a universal serial bus (USB) connection. The method may also include wherein the wired connection comprises an Ethernet connection. The method may also include wherein the tether comprises a wireless connection. The method may also include wherein the wireless connection comprises a Bluetooth connection. The method may also include wherein the wireless connection comprises a Wi-Fi connection. The method may also include wherein the wireless connection comprises a Wi-Fi Direct connection. The method may also include decompressing, by the first wireless communications device, the incoming data after the receiving via the tether. The method may also include processing, by a modem of the first wireless communications device, the outgoing data and the incoming data. The method may also include wherein the incoming data comprises I/Q data. The method may also include processing, by a modem of the first wireless communications device, the outgoing data, wherein the incoming data comprises processed data by a modem of the second wireless communications device. The method may also include wherein the processed data comprises radio frequency (RF) layer data from the modem of the second wireless communications device. The method may also include wherein the processed data comprises physical layer data from the modem of the second wireless communications device. The method may also include wherein the processed data comprises Medium Access Control (MAC) layer data from the modem of the second wireless communications device. The method may also include wherein the processed data comprises Radio Link Control (RLC) layer data from the modem of the second wireless communications device. The method may also include wherein the processed data comprises Packet Data Convergence Protocol (PDCP) layer data from the modem of the second wireless communications device. The method may also include wherein the transmitting further comprises transmitting, by the first wireless communications device, the outgoing data on a first frequency band. The method may also include wherein the first frequency band overlaps with a second frequency band corresponding to a frequency band over which the incoming data is received by the second wireless communications device. The method may also include performing, by the first wireless communications device, interference cancellation on the incoming data based on the outgoing data. The method may also include indicating, by the first wireless communications device, full-duplex capability of the first wireless communications device. The method may also include wherein the determining is based on a first transmit power of the first wireless communications device and a second transmit power of the second wireless communications device. The method may also include wherein the first transmit power is less than the second transmit power. The method may also include receiving, by the first wireless communications device in response to determining to operate in the second mode, incoming data from a fourth wireless communications device, wherein the second mode comprises the first wireless communications device as a receiver from the fourth wireless communications device and the second wireless communications device as a transmitter to the fourth wireless communications device; and transmitting, by the first wireless communications device in response to the determining to operate in the second mode, outgoing data via the tether to the second wireless communications device for transmission to the fourth wireless communications device concurrent to the receiving. The method may also include wherein the fourth wireless communications device comprises the third wireless communications device. The method may also include processing, by a modem of the first wireless communications device, the outgoing data and the incoming data. The method may also include processing, by a modem of the first wireless communications device, the incoming data, wherein the outgoing data comprises unprocessed data processed by a modem of the second wireless communications device prior to the transmission to the fourth wireless communications device. The method may also include wherein the receiving further comprises receiving the incoming data on a first frequency band. The method may also include wherein the first frequency band overlaps with a second frequency band corresponding to a frequency band over which the outgoing data is transmitted by the second wireless communications device. The method may also include performing, by the first wireless communications device, interference cancellation on the incoming data based on the outgoing data. The method may also include instructing, by the first wireless communications device, the second wireless communications device to indicate full-duplex capability of the first wireless communications device. The method may also include wherein the determining is based on a first transmit power of the first wireless communications device being greater than a second transmit power of the second wireless communications device. The method may also include wherein the first wireless communications device comprises a smart phone. The method may also include wherein the first wireless communications device comprises a head-mounted display. The method may also include wherein the first wireless communications device comprises a tablet or a laptop. The method may also include wherein the first wireless communications device comprises a mobile vehicle.

Further embodiments of the present disclosure include a method for wireless communication comprising transmitting, by a first wireless communications device connected via a tether to a second wireless communications device, outgoing data to a third wireless communications device; and receiving, by the first wireless communications device, incoming data via the tether received at the second wireless communications device from the third wireless communications device, wherein the first wireless communications device cooperates with the second wireless communications device in full-duplex communication with the third wireless communications device, the full-duplex communication comprising the transmitting and the receiving occurring simultaneously.

The method may also include wherein the tether comprises a wired connection. The method may also include wherein the wired connection comprises a universal serial bus (USB) connection. The method may also include wherein the wired connection comprises an Ethernet connection. The method may also include wherein the tether comprises a wireless connection. The method may also include wherein the wireless connection comprises a Bluetooth connection. The method may also include wherein the wireless connection comprises a Wi-Fi connection. The method may also include wherein the wireless connection comprises a Wi-Fi Direct connection. The method may also include decompressing, by the first wireless communications device, the incoming data after the receiving via the tether. The method may also include processing, by a modem of the first wireless communications device, the outgoing data and the incoming data. The method may also include wherein the incoming data comprises I/Q data. The method may also include processing, by a modem of the first wireless communications device, the outgoing data, wherein the incoming data comprises processed data by a modem of the second wireless communications device. The method may also include wherein the processed data comprises radio frequency (RF) layer data from the modem of the second wireless communications device. The method may also include wherein the processed data comprises physical layer data from the modem of the second wireless communications device. The method may also include wherein the processed data comprises Medium Access Control (MAC) layer data from the modem of the second wireless communications device. The method may also include wherein the processed data comprises Radio Link Control (RLC) layer data from the modem of the second wireless communications device. The method may also include wherein the processed data comprises Packet Data Convergence Protocol (PDCP) layer data from the modem of the second wireless communications device. The method may also include wherein the transmitting further comprises transmitting, by the first wireless communications device, the outgoing data on a first frequency band. The method may also include wherein the first frequency band overlaps with a second frequency band corresponding to a frequency band over which the incoming data is received by the second wireless communications device. The method may also include performing, by the first wireless communications device, interference cancellation on the incoming data based on the outgoing data. The method may also include indicating, by the first wireless communications device, full-duplex capability of the first wireless communications device.

Further embodiments of the present disclosure include a method for wireless communication comprising receiving, by a first wireless communications device connected via a tether to a second wireless communications device, incoming data from a third wireless communications device; and transmitting, by the first wireless communications device, outgoing data via the tether to the second wireless communications device for transmission to the third wireless communications device, wherein the first wireless communications device cooperates with the second wireless communications device in full-duplex communication with the third wireless communications device, the full-duplex communication comprising the receiving and the transmitting occurring simultaneously.

The method may also include processing, by a modem of the first wireless communications device, the outgoing data and the incoming data. The method may also include processing, by a modem of the first wireless communications device, the incoming data. The method may also include wherein the outgoing data comprises unprocessed data processed by a modem of the second wireless communications device prior to the transmission to the fourth wireless communications device. The method may also include wherein the receiving further comprises receiving the incoming data on a first frequency band. The method may also include wherein the first frequency band overlaps with a second frequency band corresponding to a frequency band over which the outgoing data is transmitted by the second wireless communications device. The method may also include performing, by the first wireless communications device, interference cancellation on the incoming data based on the outgoing data. The method may also include indicating, by the first wireless communications device, full-duplex capability of the first wireless communications device. The method may also include wherein the first wireless communications device comprises a smart phone. The method may also include wherein the first wireless communications device comprises a head-mounted display. The method may also include wherein the first wireless communications device comprises a tablet. The method may also include wherein the first wireless communications device comprises a mobile vehicle.

Further embodiments of the present disclosure include a wireless communications device comprising a processor configured to determine whether to operate in cooperation with a second wireless communications device in full-duplex communication, the full-duplex communication comprising transmitting outgoing data simultaneously to receiving incoming data; and determine, in response to determining to operate in full-duplex communication, whether to operate in a first mode of full-duplex communication or a second mode of full duplex communication; and a transceiver configured to transmit, in response to determining to operate in the first mode, the outgoing data to a third wireless communications device, wherein the first mode comprises acting as a transmitter to the third wireless communications device and the second wireless communications device acting as a receiver from the third wireless communications device; and receive, via a tether in response to the determining to operate in the first mode, the incoming data received at the second wireless communications device from the third wireless communications device.

The wireless communications device may also include wherein the tether comprises a wired connection. The wireless communications device may also include wherein the wired connection comprises a universal serial bus (USB) connection. The wireless communications device may also include wherein the wired connection comprises an Ethernet connection. The wireless communications device may also include wherein the tether comprises a wireless connection. The wireless communications device may also include wherein the wireless connection comprises a Bluetooth connection. The wireless communications device may also include wherein the wireless connection comprises a Wi-Fi connection. The wireless communications device may also include wherein the wireless connection comprises a Wi-Fi Direct connection. The wireless communications device may also include a modem configured to decompress the incoming data. The wireless communications device may also include a modem configured to process the outgoing data and the incoming data. The wireless communications device may also include wherein the incoming data comprises I/Q data. The wireless communications device may also include a modem configured to process the outgoing data, wherein the incoming data comprises processed data by a modem of the second wireless communications device. The wireless communications device may also include wherein the processed data comprises radio frequency (RF) layer data from the modem of the second wireless communications device. The wireless communications device may also include wherein the processed data comprises physical layer data from the modem of the second wireless communications device. The wireless communications device may also include wherein the processed data comprises Medium Access Control (MAC) layer data from the modem of the second wireless communications device. The wireless communications device may also include wherein the processed data comprises Radio Link Control (RLC) layer data from the modem of the second wireless communications device. The wireless communications device may also include wherein the processed data comprises Packet Data Convergence Protocol (PDCP) layer data from the modem of the second wireless communications device. The wireless communications device may also include wherein the transceiver is further configured to transmit the outgoing data on a first frequency band. The wireless communications device may also include wherein the first frequency band overlaps with a second frequency band corresponding to a frequency band over which the incoming data is received by the second wireless communications device. The wireless communications device may also include wherein the transceiver is further configured to perform interference cancellation on the incoming data based on the outgoing data. The wireless communications device may also include wherein the transceiver is further configured to indicate full-duplex capability of the wireless communications device. The wireless communications device may also include wherein the processor is further configured to base the determining on a first transmit power of the wireless communications device and a second transmit power of the second wireless communications device. The wireless communications device may also include wherein the first transmit power is less than the second transmit power. The wireless communications device may also include wherein the transceiver is configured to receive, in response to determining to operate in the second mode, incoming data from a fourth wireless communications device, wherein the second mode comprises acting as a receiver from the fourth wireless communications device and the second wireless communications device acting as a transmitter to the fourth wireless communications device; and transmit, in response to the determining to operate in the second mode, outgoing data via the tether to the second wireless communications device for transmission to the fourth wireless communications device concurrent to the receiving. The wireless communications device may also include wherein the fourth wireless communications device comprises the third wireless communications device. The wireless communications device may also include a modem configured to process the outgoing data and the incoming data. The wireless communications device may also include a modem configured to process the incoming data, wherein the outgoing data comprises unprocessed data processed by a modem of the second wireless communications device prior to the transmission to the fourth wireless communications device. The wireless communications device may also include wherein the receiving further comprises receiving the incoming data is received on a first frequency band. The wireless communications device may also include wherein the first frequency band overlaps with a second frequency band corresponding to a frequency band over which the outgoing data is transmitted by the second wireless communications device. The wireless communications device may also include wherein the transceiver is configured to perform interference cancellation on the incoming data based on the outgoing data. The wireless communications device may also include wherein the transceiver is configured to instruct the second wireless communications device to indicate full-duplex capability of the wireless communications device. The wireless communications device may also include wherein the processor is further configured to base the determination on a first transmit power of the wireless communications device being greater than a second transmit power of the second wireless communications device. The wireless communications device may also include wherein the wireless communications device comprises a smart phone. The wireless communications device may also include wherein the wireless communications device comprises a head-mounted display. The wireless communications device may also include wherein the wireless communications device comprises comprising a tablet. The wireless communications device may also include wherein the wireless communications device comprises a mobile vehicle.

Further embodiments of the present disclosure include a wireless communications device comprising a processor; and a transceiver configured to cooperate via a tether with a second wireless communications device in full-duplex communication with a third device, the full-duplex communication comprising transmitting outgoing data simultaneously to receiving incoming data; transmit, as part of the full-duplex communication, the outgoing data to the third wireless communications device; and receive, via the tether, the incoming data received at the second wireless communications device from the third wireless communications device as part of the full-duplex communication.

The wireless communications device may also include wherein the tether comprises a wired connection. The wireless communications device may also include wherein the wired connection comprises a universal serial bus (USB) connection. The wireless communications device may also include wherein the wired connection comprises an Ethernet connection. The wireless communications device may also include wherein the tether comprises a wireless connection. The wireless communications device may also include wherein the wireless connection comprises a Bluetooth connection. The wireless communications device may also include wherein the wireless connection comprises a Wi-Fi connection. The wireless communications device may also include wherein the wireless connection comprises a Wi-Fi Direct connection. The wireless communications device may also include a modem configured decompress the incoming data. The wireless communications device may also include a modem configured to process the outgoing data and the incoming data. The wireless communications device may also include wherein the incoming data comprises I/Q data. The wireless communications device may also include a modem configured to process the outgoing data, wherein the incoming data comprises processed data by a modem of the second wireless communications device. The wireless communications device may also include wherein the processed data comprises radio frequency (RF) layer data from the modem of the second wireless communications device. The wireless communications device may also include wherein the processed data comprises physical layer data from the modem of the second wireless communications device. The wireless communications device may also include wherein the processed data comprises Medium Access Control (MAC) layer data from the modem of the second wireless communications device. The wireless communications device may also include wherein the processed data comprises Radio Link Control (RLC) layer data from the modem of the second wireless communications device. The wireless communications device may also include wherein the processed data comprises Packet Data Convergence Protocol (PDCP) layer data from the modem of the second wireless communications device. The wireless communications device may also include wherein the transceiver is further configured to transmit the outgoing data on a first frequency band. The wireless communications device may also include wherein the first frequency band overlaps with a second frequency band corresponding to a frequency band over which the incoming data is received by the second wireless communications device. The wireless communications device may also include wherein the transceiver is further configured to perform interference cancellation on the incoming data based on the outgoing data. The wireless communications device may also include wherein the transceiver is further configured to indicate full-duplex capability of the wireless communications device.

Further embodiments of the present disclosure include a wireless communications device comprising a processor; and a transceiver configured to cooperate via a tether with a second wireless communications device in full-duplex communication with a third device, the full-duplex communication comprising transmitting outgoing data simultaneously to receiving incoming data; receive, as part of the full-duplex communication, the incoming data from the third wireless communications device; and transmit, via the tether, the outgoing data to the second wireless communications device for transmission as part of the full-duplex communication to the wireless communications device concurrent to the receiving.

The wireless communications device may also include a modem configured to process the outgoing data and the incoming data. The wireless communications device may also include a modem configured to process the incoming data. The wireless communications device may also include wherein the outgoing data comprises unprocessed data processed by a modem of the second wireless communications device prior to the transmission to the third wireless communications device. The wireless communications device may also include wherein the transceiver is configured to receive the incoming data on a first frequency band. The wireless communications device may also include wherein the first frequency band overlaps with a second frequency band corresponding to a frequency band over which the outgoing data is transmitted by the second wireless communications device. The wireless communications device may also include wherein the transceiver is configured to perform interference cancellation on the incoming data based on the outgoing data. The wireless communications device may also include wherein the transceiver is configured to instruct the second wireless communications device to indicate full-duplex capability of the wireless communications. The wireless communications device may also include wherein the wireless communications device comprises a smart phone. The wireless communications device may also include wherein the wireless communications device comprises a head-mounted display. The wireless communications device may also include wherein the wireless communications device comprises a tablet. The wireless communications device may also include wherein the wireless communications device comprises a mobile vehicle.

Further embodiments of the present disclosure include a non-transitory computer-readable medium having program code recorded thereon, the program code comprising code for causing a first wireless communications device, connected via a tether to a second wireless communications device, to determine whether to operate in cooperation with the second wireless communications device in full-duplex communication, the full-duplex communication comprising transmitting outgoing data simultaneously to receiving incoming data; code for causing the first wireless communications device to determine, in response to determining to operate in full-duplex communication, whether to operate in a first mode of full-duplex communication or a second mode of full-duplex communication; code for causing the first wireless communications device to transmit, in response to determining to operate in the first mode, the outgoing data to a third wireless communications device, wherein the first mode comprises the first wireless communications device as a transmitter to the third wireless communications device and the second wireless communications device as a receiver from the third wireless communications device; and code for causing the first wireless communications device to receive, in response to the determining to operate in the first mode, the incoming data via the tether received at the second wireless communications device from the third wireless communications device.

The non-transitory computer-readable medium may also include wherein the tether comprises a wired connection. The non-transitory computer-readable medium may also include wherein the wired connection comprises a universal serial bus (USB) connection. The non-transitory computer-readable medium may also include wherein the wired connection comprises an Ethernet connection. The non-transitory computer-readable medium may also include wherein the tether comprises a wireless connection. The non-transitory computer-readable medium may also include wherein the wireless connection comprises a Bluetooth connection. The non-transitory computer-readable medium may also include wherein the wireless connection comprises a Wi-Fi connection. The non-transitory computer-readable medium may also include wherein the wireless connection comprises a Wi-Fi Direct connection. The non-transitory computer-readable medium may also include code for causing the first wireless communications device to decompress the incoming data. The non-transitory computer-readable medium may also include code for causing the first wireless communications device to process the outgoing data and the incoming data. The non-transitory computer-readable medium may also include wherein the incoming data comprises I/Q data. The non-transitory computer-readable medium may also include code for causing the first wireless communications device to process the outgoing data, wherein the incoming data comprises processed data by a modem of the second wireless communications device. The non-transitory computer-readable medium may also include wherein the processed data comprises radio frequency (RF) layer data from the modem of the second wireless communications device. The non-transitory computer-readable medium may also include wherein the processed data comprises physical layer data from the modem of the second wireless communications device. The non-transitory computer-readable medium may also include wherein the processed data comprises Medium Access Control (MAC) layer data from the modem of the second wireless communications device. The non-transitory computer-readable medium may also include wherein the processed data comprises Radio Link Control (RLC) layer data from the modem of the second wireless communications device. The non-transitory computer-readable medium may also include wherein the processed data comprises Packet Data Convergence Protocol (PDCP) layer data from the modem of the second wireless communications device. The non-transitory computer-readable medium may also include code for causing the first wireless communications device to transmit the outgoing data on a first frequency band. The non-transitory computer-readable medium may also include wherein the first frequency band overlaps with a second frequency band corresponding to a frequency band over which the incoming data is received by the second wireless communications device. The non-transitory computer-readable medium may also include code for causing the first wireless communications device to perform interference cancellation on the incoming data based on the outgoing data. The non-transitory computer-readable medium may also include code for causing the first wireless communications device to indicate full-duplex capability. The non-transitory computer-readable medium may also include wherein the determining is based on a first transmit power of the first wireless communications device and a second transmit power of the second wireless communications device. The non-transitory computer-readable medium may also include wherein the first transmit power is less than the second transmit power. The non-transitory computer-readable medium may also include code for causing the first wireless communications device to receive, in response to determining to operate in the second mode, incoming data from a fourth wireless communications device, wherein the second mode comprises the first wireless communications device as a receiver from the fourth wireless communications device and the second wireless communications device as a transmitter to the fourth wireless communications device; and code for causing the first wireless communications device to transmit, in response to the determining to operate in the second mode, outgoing data via the tether to the second wireless communications device for transmission to the fourth wireless communications device concurrent to the receiving. The non-transitory computer-readable medium may also include wherein the fourth wireless communications device comprises the third wireless communications device. The non-transitory computer-readable medium may also include code for causing the first wireless communications device to process the outgoing data and the incoming data. The non-transitory computer-readable medium may also include code for causing the first wireless communications device to process the incoming data, wherein the outgoing data comprises unprocessed data processed by a modem of the second wireless communications device prior to the transmission to the fourth wireless communications device. The non-transitory computer-readable medium may also include code for causing the first wireless communications device to receive incoming data on a first frequency band. The non-transitory computer-readable medium may also include wherein the first frequency band overlaps with a second frequency band corresponding to a frequency band over which the outgoing data is transmitted by the second wireless communications device. The non-transitory computer-readable medium may also include code for causing the first wireless communications device to perform interference cancellation on the incoming data based on the outgoing data. The non-transitory computer-readable medium may also include code for causing the first wireless communications device to instruct the second wireless communications device to full-duplex capability of the first wireless communications device. The non-transitory computer-readable medium may also include wherein the code for causing the first wireless communications device to determine whether to operate in a first mode or a second mode further comprises code for causing the first wireless communications device to determine whether to operate in the first mode or the second mode based on a first transmit power of the first wireless communications device being greater than a second transmit power of the second wireless communications device. The non-transitory computer-readable medium may also include wherein the first wireless communications device comprises a smart phone. The non-transitory computer-readable medium may also include wherein the first wireless communications device comprises a head-mounted display. The non-transitory computer-readable medium may also include wherein the first wireless communications device comprises a tablet. The non-transitory computer-readable medium may also include wherein the first wireless communications device comprises a mobile vehicle.

Further embodiments of the present disclosure include a non-transitory computer-readable medium having program code recorded thereon, the program code comprising code for causing a first wireless communications device, connected via a tether to a second wireless communications device, to transmit outgoing data to a third wireless communications device; and code for causing the first wireless communications device to receive, via the tether, incoming data received at the second wireless communications device from the third wireless communications device, wherein the first wireless communications device cooperates with the second wireless communications device in full-duplex communication with the third wireless communications device, the full-duplex communication comprising the transmitting and the receiving occurring simultaneously.

The non-transitory computer-readable medium may also include wherein the tether comprises a wired connection. The non-transitory computer-readable medium may also include wherein the wired connection comprises a universal serial bus (USB) connection. The non-transitory computer-readable medium may also include wherein the wired connection comprises an Ethernet connection. The non-transitory computer-readable medium may also include wherein the tether comprises a wireless connection. The non-transitory computer-readable medium may also include wherein the wireless connection comprises a Bluetooth connection. The non-transitory computer-readable medium may also include wherein the wireless connection comprises a Wi-Fi connection. The non-transitory computer-readable medium may also include wherein the wireless connection comprises a Wi-Fi Direct connection. The non-transitory computer-readable medium may also include code for causing the first wireless communications device to decompress the incoming data. The non-transitory computer-readable medium may also include code for causing the first wireless communications device to process the outgoing data and the incoming data. The non-transitory computer-readable medium may also include wherein the incoming data comprises I/Q data. The non-transitory computer-readable medium may also include code for causing the first wireless communications device to process the outgoing data, wherein the incoming data comprises processed data by a modem of the second wireless communications device. The non-transitory computer-readable medium may also include wherein the processed data comprises radio frequency (RF) layer data from the modem of the second wireless communications device. The non-transitory computer-readable medium may also include wherein the processed data comprises physical layer data from the modem of the second wireless communications device. The non-transitory computer-readable medium may also include wherein the processed data comprises Medium Access Control (MAC) layer data from the modem of the second wireless communications device. The non-transitory computer-readable medium may also include wherein the processed data comprises Radio Link Control (RLC) layer data from the modem of the second wireless communications device. The non-transitory computer-readable medium may also include wherein the processed data comprises Packet Data Convergence Protocol (PDCP) layer data from the modem of the second wireless communications device. The non-transitory computer-readable medium may also include code for causing the first wireless communications device to transmit the outgoing data on a first frequency band. The non-transitory computer-readable medium may also include wherein the first frequency band overlaps with a second frequency band corresponding to a frequency band over which the incoming data is received by the second wireless communications device. The non-transitory computer-readable medium may also include code for causing the first wireless communications device to perform interference cancellation on the incoming data based on the outgoing data. The non-transitory computer-readable medium may also include code for causing the first wireless communications device to full-duplex capability.

Further embodiments of the present disclosure include a non-transitory computer-readable medium having program code recorded thereon, the program code comprising code for causing a first wireless communications device, connected via a tether to a second wireless communications device, to receive incoming data from a third wireless communications device; and code for causing the first wireless communications device to transmit outgoing data via the tether to the second wireless communications device for transmission to the third wireless communications device, wherein the first wireless communications device cooperates with the second wireless communications device in full-duplex communication with the third wireless communications device, the full-duplex communication comprising the transmitting and the receiving occurring substantially simultaneously.

The non-transitory computer-readable medium may also include code for causing the first wireless communications device to process the outgoing data and the incoming data. The non-transitory computer-readable medium may also include code for causing the first wireless communications device to process the incoming data. The non-transitory computer-readable medium may also include wherein the outgoing data comprises unprocessed data processed by a modem of the second wireless communications device prior to the transmission to the fourth wireless communications device. The non-transitory computer-readable medium may also include code for causing the first wireless communications device to receive incoming data on a first frequency band. The non-transitory computer-readable medium may also include wherein the first frequency band overlaps with a second frequency band over which the outgoing data is transmitted by the second wireless communications device. The non-transitory computer-readable medium may also include code for causing the first wireless communications device to perform interference cancellation on the incoming data based on the outgoing data. The non-transitory computer-readable medium may also include code for causing the first wireless communications device to instruct the second wireless communications device to indicate full-duplex capability of the first wireless communications device. The non-transitory computer-readable medium may also include wherein the first wireless communications device comprises a smart phone. The non-transitory computer-readable medium may also include wherein the first wireless communications device comprises a head-mounted display. The non-transitory computer-readable medium may also include wherein the first wireless communications device comprises a tablet. The non-transitory computer-readable medium may also include wherein the first wireless communications device comprises a mobile vehicle.

Further embodiments of the present disclosure include a wireless communications device comprising means for determining whether to operate in cooperation with a second wireless communications device connected via a tether to the wireless communications device in full-duplex communication, the full duplex-communication comprising transmitting outgoing data simultaneously to receiving incoming data; means for determining, in response to determining to operate in full-duplex communication, whether to operate in a first mode of full-duplex communication or a second mode of full-duplex communication; means for transmitting, in response to determining to operate in the first mode, the outgoing data to a third wireless communications device, wherein the first mode comprises the first wireless communications device as a transmitter to the third wireless communications device and the second wireless communications device as a receiver from the third wireless communications device; and means for receiving, in response to the determining to operate in the first mode, the incoming data via the tether received at the second wireless communications device from the third wireless communications device.

The wireless communications device may also include wherein the tether comprises a wired connection. The wireless communications device may also include wherein the wired connection comprises a universal serial bus (USB) connection. The wireless communications device may also include wherein the wired connection comprises an Ethernet connection. The wireless communications device may also include wherein the tether comprises a wireless connection. The wireless communications device may also include wherein the wireless connection comprises a Bluetooth connection. The wireless communications device may also include wherein the wireless connection comprises a Wi-Fi connection. The wireless communications device may also include wherein the wireless connection comprises a Wi-Fi Direct connection. The wireless communications device may also include means for decompressing the incoming data. The wireless communications device may also include means for processing the outgoing data and the incoming data. The wireless communications device may also include wherein the incoming data comprises I/Q data. The wireless communications device may also include means for processing the outgoing data, wherein the incoming data comprises processed data by a modem of the second wireless communications device. The wireless communications device may also include wherein the processed data comprises radio frequency (RF) layer data from the modem of the second wireless communications device. The wireless communications device may also include wherein the processed data comprises physical layer data from the modem of the second wireless communications device. The wireless communications device may also include wherein the processed data comprises Medium Access Control (MAC) layer data from the modem of the second wireless communications device. The wireless communications device may also include wherein the processed data comprises Radio Link Control (RLC) layer data from the modem of the second wireless communications device. The wireless communications device may also include wherein the processed data comprises Packet Data Convergence Protocol (PDCP) layer data from the modem of the second wireless communications device. The wireless communications device may also include wherein the means for transmitting further comprises means for transmitting the outgoing data on a first frequency band. The wireless communications device may also include wherein the first and second frequency bands overlap. The wireless communications device may also include means for performing interference cancellation on the incoming data based on the outgoing data. The wireless communications device may also include means for indicating full-duplex capability. The wireless communications device may also include wherein the means for determining is based on a first transmit power of the wireless communications device and a second transmit power of the second wireless communications device. The wireless communications device may also include wherein the first transmit power is less than the second transmit power. The wireless communications device may also include means for receiving, in response to determining to operate in the second mode, incoming data from a fourth wireless communications device, wherein the second mode comprises the first wireless communications device as a receiver from the fourth wireless communications device and the second wireless communications device as a transmitter to the fourth wireless communications device; and means for transmitting, in response to determining to operate in the second mode, outgoing data via the tether to the second wireless communications device for transmission to the fourth wireless communications device concurrent to the receiving. The wireless communications device may also include wherein the fourth wireless communications device comprises the third wireless communications device. The wireless communications device may also include means for processing the outgoing data and the incoming data. The wireless communications device may also include means for processing the incoming data, wherein the outgoing data comprises unprocessed data processed by a modem of the second wireless communications device prior to the transmission to the fourth wireless communications device. The wireless communications device may also include wherein the means for receiving further comprises means for receiving the incoming data on a first frequency band. The wireless communications device may also include wherein the first frequency band overlaps with a second frequency band corresponding to a frequency band over which the outgoing data is transmitted by the second wireless communications device. The wireless communications device may also include means for performing interference cancellation on the incoming data based on the outgoing data. The wireless communications device may also include means for instructing the second wireless communications device to indicate full-duplex capability of the wireless communications device. The wireless communications device may also include wherein the means for determining is based on a first transmit power of the wireless communications device being greater than a second transmit power of the second wireless communications device. The wireless communications device may also include wherein the first wireless communications device comprises a smart phone. The wireless communications device may also include wherein the first wireless communications device comprises a head-mounted display. The wireless communications device may also include wherein the first wireless communications device comprises a tablet. The wireless communications device may also include wherein the first wireless communications device comprises a mobile vehicle.

Further embodiments of the present disclosure include a wireless communications device comprising means for transmitting outgoing data to a third wireless communications device; and means receiving, via a tether to a second wireless communications device, incoming data received at the second wireless communications device from the third wireless communications device, wherein the wireless communications device cooperates with the second wireless communications device in full-duplex communication with the third wireless communications device, the full-duplex communication comprising the transmitting and the receiving occurring simultaneously.

The wireless communications device may also include wherein the tether comprises a wired connection. The wireless communications device may also include wherein the wired connection comprises a universal serial bus (USB) connection. The wireless communications device may also include wherein the wired connection comprises an Ethernet connection. The wireless communications device may also include wherein the tether comprises a wireless connection. The wireless communications device may also include wherein the wireless connection comprises a Bluetooth connection. The wireless communications device may also include wherein the wireless connection comprises a Wi-Fi connection. The wireless communications device may also include wherein the wireless connection comprises a Wi-Fi Direct connection. The wireless communications device may also include means for decompressing the incoming data. The wireless communications device may also include means for processing the outgoing data and the incoming data. The wireless communications device may also include wherein the incoming data comprises I/Q data. The wireless communications device may also include means for processing the outgoing data, wherein the incoming data comprises processed data by a modem of the second wireless communications device. The wireless communications device may also include wherein the processed data comprises radio frequency (RF) layer data from the modem of the second wireless communications device. The wireless communications device may also include wherein the processed data comprises physical layer data from the modem of the second wireless communications device. The wireless communications device may also include wherein the processed data comprises Medium Access Control (MAC) layer data from the modem of the second wireless communications device. The wireless communications device may also include wherein the processed data comprises Radio Link Control (RLC) layer data from the modem of the second wireless communications device. The wireless communications device may also include wherein the processed data comprises Packet Data Convergence Protocol (PDCP) layer data from the modem of the second wireless communications device. The wireless communications device may also include wherein the means for transmitting further comprises means for transmitting the outgoing data on a first frequency band. The wireless communications device may also include wherein the first frequency band overlaps with a second frequency band corresponding to a frequency band over which the incoming data is received by the second wireless communications device. The wireless communications device may also include means for performing interference cancellation on the incoming data based on the outgoing data. The wireless communications device may also include means for indicating full-duplex capability.

Further embodiments of the present disclosure include a wireless communications device comprising means for receiving incoming data from a third wireless communications device; and means for transmitting, via a tether to a second wireless communications device, outgoing data to the second wireless communications device for transmission to the third wireless communications device, wherein the wireless communications device is cooperating with the second wireless communications device in full-duplex communication with the third wireless communications device, the full-duplex communication comprising the transmitting and the receiving occurring simultaneously.

The wireless communications device may also include means for processing the outgoing data and the incoming data. The wireless communications device may also include means for processing the incoming data. The wireless communications device may also include wherein the outgoing data comprises unprocessed data processed by a modem of the second wireless communications device prior to the transmission to the third wireless communications device. The wireless communications device may also include wherein the means for receiving further comprises means for receiving the incoming data on a first frequency band. The wireless communications device may also include wherein the first frequency band overlaps with a second frequency band corresponding to a frequency band over which the outgoing data is transmitted by the second wireless communications device. The wireless communications device may also include means for performing interference cancellation on the incoming data based on the outgoing data. The wireless communications device may also include means for instructing the second wireless communications device to indicate full-duplex capability of the wireless communications device. The wireless communications device may also include wherein the first wireless communications device comprises a smart phone. The wireless communications device may also include wherein the first wireless communications device comprises a head-mounted display. The wireless communications device may also include wherein the first wireless communications device comprises a tablet. The wireless communications device may also include wherein the first wireless communications device comprises a mobile vehicle.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for wireless communication comprising:
    determining, by a first wireless communications device connected via a tether to a second wireless communications device, whether to operate in cooperation with the second wireless communications device in full-duplex communication, the full-duplex communication comprising transmitting outgoing data simultaneously to receiving incoming data;
    determining, by the first wireless communications device, to operate as a transmitter in full duplex communication in cooperation with the second wireless communications device, based on a first transmit power of the first wireless communications device being less than a second transmit power of the second wireless communications device;
    communicating, by the first wireless communications device with the second wireless communications device via the tether, an indication of a protocol layer at which to perform processing on the incoming data including a plurality of packets;
    transmitting, by the first wireless communications device in response to determining to operate as the transmitter in full duplex communication, the outgoing data to a third wireless communications device, wherein the second wireless communications device functions as a receiver from the third wireless communications device at substantially the same time as the transmitting by the first wireless communications device;
    receiving, by the first wireless communications device in response to the determining to operate in full duplex communication via the tether from the second wireless communications device, the incoming data including the plurality of packets received at the second wireless communications device from the third wireless communications device;
    processing the plurality of packets based on the indicated protocol layer;
    determining, by the first wireless communications device, to operate as a receiver in full duplex communication in cooperation with the second wireless communications device, based on a third transmit power of the first wireless communications device being greater than a fourth transmit power of the second wireless communications device; and
    transmitting, by the first wireless communications device in response to determining to operate as the receiver in full duplex communication, the outgoing data to the third wireless communications device via the tether.

2. The method of claim 1, wherein the tether comprises a universal serial bus (USB) connection.

3. The method of claim 1, wherein the tether comprises at least one of a sidelink connection, a Bluetooth connection, or a Wi-Fi connection.

4. The method of claim 1, further comprising:
    processing, by a modem of the first wireless communications device, the outgoing data and the incoming data based on the indication of the protocol layer.

5. The method of claim 1, further comprising:
    processing, by a modem of the first wireless communications device, the outgoing data, wherein the incoming data comprises data processed by a modem of the second wireless communications device based on the indication of protocol layer.

6. The method of claim 5, wherein the indicated protocol layer is one of a radio frequency (RF) layer or a physical layer, and wherein the processed data comprises:
    radio frequency (RF) layer data from the modem of the second wireless communications device; or
    physical layer data from the modem of the second wireless communications device.

7. The method of claim 1, wherein the first wireless communications device functions as an only transmitter to the third wireless communications device, and the second wireless communications device functions as an only receiver from the third wireless communications device for the first wireless communications device when the first transmit power of the first wireless communications device is less than the second transmit power of the second wireless communications device.

8. The method of claim 1, wherein the determining to operate as a transmitter in full duplex communication in cooperation with the second wireless communications device is further based on a measured interference level.

9. A method for wireless communication comprising:
    determining, by a first wireless communications device connected via a tether to a second wireless communications device, whether to operate in cooperation with the second wireless communications device in full-duplex communication, the full-duplex communication comprising transmitting outgoing data simultaneously to receiving incoming data;

determining, by the first wireless communications device, to operate as a receiver in full duplex communication in cooperation with the second wireless communications device, based on a first transmit power of the first wireless communications device being greater than a second transmit power of the second wireless communications device;

communicating, by the first wireless communications device with the second wireless communications device via the tether, an indication of a protocol layer at which to perform processing on the outgoing data including a plurality of packets;

receiving, by the first wireless communications device in response to determining to operate as the receiver in full duplex communication, incoming data from a third wireless communications device, wherein the second wireless communications device functions as a transmitter to the third wireless communications device at substantially the same time as the receiving by the first wireless communications device;

transmitting, by the first wireless communications device in response to the determining to operate in full duplex communication, the outgoing data including the plurality of packets via the tether at the indicated protocol layer to the second wireless communications device for transmission to the third wireless communications device concurrent to the receiving;

determining, by the first wireless communications device, to operate as a transmitter in full duplex communication in cooperation with the second wireless communications device, based on a third transmit power of the first wireless communications device being less than a fourth transmit power of the second wireless communications device; and receiving, by the first wireless communications device in response to determining to operate as the transmitter in full duplex communication, the incoming data from the third wireless communications device via the tether.

10. The method of claim 9, wherein the tether comprises a universal serial bus (USB) connection.

11. The method of claim 9, wherein the tether comprises at least one of a sidelink connection, a Bluetooth connection, or a Wi-Fi connection.

12. The method of claim 9, further comprising:
processing, by a modem of the first wireless communications device, the outgoing data and the incoming data based on the indication of the protocol layer.

13. The method of claim 12, wherein the processed outgoing data comprises radio frequency (RF) layer data from the modem of the first wireless communications device based on the indication of protocol layer.

14. The method of claim 12, wherein the indicated protocol layer is a physical layer, and wherein the processed outgoing data comprises physical layer data from the modem of the first wireless communications device.

15. The method of claim 9, further comprising:
processing, by a modem of the first wireless communications device, the incoming data, wherein the outgoing data comprises unprocessed data processed by a modem of the second wireless communications device prior to the transmission to the third wireless communications device.

16. The method of claim 9, wherein the determining to operate as a receiver in full duplex communication in cooperation with the second wireless communications device is further based on a measured interference level.

17. A wireless communications device comprising:
one or more memories; and
one or more processors coupled to the one or more memories, the one or more memories storing instructions that are executable by the one or more processors, individually or in any combination, to cause the wireless communications device to:
determine whether to operate in cooperation with a second wireless communications device in full-duplex communication, the full-duplex communication comprising transmitting outgoing data simultaneously to receiving incoming data;
determine to operate as a transmitter in full duplex communication in cooperation with the second wireless communications device, based on a first transmit power of the first wireless communications device being less than a second transmit power of the second wireless communications device;
communicate, via a tether, an indication of a protocol layer at which to perform processing on the incoming data including a plurality of packets;
transmit, in response to determining to operate as the transmitter in full duplex communication, the outgoing data to a third wireless communications device, wherein the second wireless communications device functions as a receiver from the third wireless communications device at substantially the same time as the first wireless communications device transmits;
receive, via the tether in response to the determining to operate in full duplex communication, the incoming data including the plurality of packets received at the second wireless communications device from the third wireless communications device;
process the plurality of packets based on the indicated protocol layer;
determine to operate as a receiver in full duplex communication in cooperation with the second wireless communications device, based on a third transmit power of the first wireless communications device being greater than a fourth transmit power of the second wireless communications device; and
transmit, in response to determining to operate as the receiver in full duplex communication, the outgoing data to the third wireless communications device via the tether.

18. The wireless communications device of claim 17, wherein the tether comprises a universal serial bus (USB) connection.

19. The wireless communications device of claim 17, wherein the tether comprises at least one of a sidelink connection, a Bluetooth connection, or a Wi-Fi connection.

20. The wireless communications device of claim 17, the one or more processors further configured, individually or in any combination, to cause the wireless communications device to:
process the outgoing data and the incoming data based on the indication of the protocol layer.

21. The wireless communications device of claim 17, the one or more processors further configured, individually or in any combination, to cause the wireless communications device to:
  process the outgoing data, wherein the incoming data comprises data processed by a modem of the second wireless communications device based on the indication of protocol layer.

22. The wireless communications device of claim 21, wherein the indicated protocol layer is one of a radio frequency (RF) layer or a physical layer, and wherein the processed data comprises:
  radio frequency (RF) layer data from the modem of the second wireless communications device; or
  physical layer data from the modem of the second wireless communications device.

23. The wireless communications device of claim 17, wherein the wireless communications device functions as an only transmitter to the third wireless communications device, and the second wireless communications device functions as an only receiver from the third wireless communications device for the wireless communications device when the first transmit power of the first wireless communications device is less than the second transmit power of the second wireless communications device.

24. A wireless communications device comprising:
  one or more memories; and
  one or more processors coupled to the one or more memories, the one or more memories storing instructions that are executable by the one or more processors, individually or in any combination, to cause the wireless communications device to:
    determine whether to operate in cooperation with a second wireless communications device in full-duplex communication, the full-duplex communication comprising transmitting outgoing data simultaneously to receiving incoming data;
    determine to operate as a receiver in full duplex communication in cooperation with the second wireless communications device, based on a first transmit power of the first wireless communications device being greater than a second transmit power of the second wireless communications device;
    communicate, via a tether, an indication a protocol layer at which to perform processing on the outgoing data including a plurality of packets;
    receive, in response to determining to operate as the receiver in full duplex communication, incoming data from a third wireless communications device, wherein the second wireless communications device functions as a transmitter to the third wireless communications device at substantially the same time as the wireless communication device receives;
    transmit, in response to the determining to operate in full duplex communication, outgoing data including the plurality of packets via the tether at the indicated protocol layer to the second wireless communications device for transmission to the third wireless communications device concurrent to the receiving;
    determine to operate as a transmitter in full duplex communication in cooperation with the second wireless communications device, based on a third transmit power of the first wireless communications device being less than a fourth transmit power of the second wireless communications device; and
    receive, in response to determining to operate as the transmitter in full duplex communication, the incoming data from the third wireless communications device via the tether.

25. The wireless communications device of claim 24, wherein the tether comprises a universal serial bus (USB) connection.

26. The wireless communications device of claim 24, wherein the tether comprises at least one of a sidelink connection, a Bluetooth connection, or a Wi-Fi connection.

27. The wireless communications device of claim 24, the one or more processors further configured, individually or in any combination, to cause the wireless communications device to:
  process the outgoing data and the incoming data based on the indication of the protocol layer.

28. The wireless communications device of claim 27, wherein the processed outgoing data comprises radio frequency (RF) layer data from a modem of the wireless communications device based on the indication of protocol layer.

29. The wireless communications device of claim 27, wherein the indicated protocol layer is a physical layer, and wherein the processed outgoing data comprises physical layer data from a modem of the wireless communications device.

30. The wireless communications device of claim 24, the one or more processors further configured, individually or in any combination, to cause the wireless communications device to:
  process the incoming data, wherein the outgoing data comprises unprocessed data processed by a modem of the second wireless communications device prior to the transmission to the third wireless communications device.

* * * * *